(12) United States Patent
Clark et al.

(10) Patent No.: US 7,657,509 B2
(45) Date of Patent: Feb. 2, 2010

(54) SYSTEM TO MANAGE AND STORE BACKUP AND RECOVERY META DATA

(75) Inventors: Richard J. Clark, Campbell, CA (US); Satish K. Chandrasekaran, Dublin, CA (US); Joshua D. Collins, Oakland, CA (US)

(73) Assignee: Aptare, Inc., Campbell, CA (US)

( * ) Notice: Subject to any disclaimer, the term of this patent is extended or adjusted under 35 U.S.C. 154(b) by 0 days.

(21) Appl. No.: 10/555,603

(22) PCT Filed: May 6, 2004

(86) PCT No.: PCT/US2004/014311

§ 371 (c)(1),
(2), (4) Date: Sep. 7, 2006

(87) PCT Pub. No.: WO2004/099993

PCT Pub. Date: Nov. 18, 2004

(65) Prior Publication Data

US 2007/0061385 A1 Mar. 15, 2007

Related U.S. Application Data

(60) Provisional application No. 60/468,491, filed on May 6, 2003.

(51) Int. Cl.
G06F 7/00 (2006.01)

(52) U.S. Cl. .......................................... 707/3

(58) Field of Classification Search ...................... 707/3, 707/10, 202, 204, 206
See application file for complete search history.

(56) References Cited

U.S. PATENT DOCUMENTS

| 5,276,867 | A | 1/1994 | Kenley et al. | ............... 707/204 |
| 5,974,242 | A | 10/1999 | Damarla et al. | ................ 716/2 |
| 6,397,351 | B1 * | 5/2002 | Miller et al. | .................. 714/13 |
| 6,453,325 | B1 * | 9/2002 | Cabrera et al. | ............. 707/204 |
| 6,466,978 | B1 * | 10/2002 | Mukherjee et al. | .......... 709/225 |
| 7,035,840 | B2 * | 4/2006 | Nakos et al. | ................... 707/2 |
| 2002/0049744 | A1 | 4/2002 | Nakos et al. | |
| 2002/0174139 | A1 | 11/2002 | Midgley et al. | ............. 707/204 |
| 2003/0028736 | A1 | 2/2003 | Berkowitz et al. | .......... 711/162 |
| 2003/0061537 | A1 | 3/2003 | Cha et al. | ..................... 714/16 |
| 2004/0002989 | A1 | 1/2004 | Kaminer | ..................... 707/102 |

OTHER PUBLICATIONS

Office Action in U.S. Appl. No. 10/555,602, mailed Mar. 31, 2008.

* cited by examiner

Primary Examiner—Charles Rones
Assistant Examiner—Fazlul Quader
(74) Attorney, Agent, or Firm—Beyer Law Group LLP

(57) ABSTRACT

A system to manage backup and recovery meta data. A database (54) including a schema (70) having a file table (72), a backup table (74), and a link table (76) stores the backup and recovery meta data. A computerized console portal system (30) then accepts instruction regarding the meta data from a computerized administrator system (24).

15 Claims, 21 Drawing Sheets

| | Custom Interval | Previous Week | 7 Days Ago | ... | Yesterday | Today | Overall |
|---|---|---|---|---|---|---|---|
| Server 1 | :) | :) | :) | ... | :) | :) | :) |
| Domain A:<br>• Server 2<br>• Domain B:<br>  - Server 3<br>  - Server 4<br>• Server 5 | :) | :\| | :( | ... | :) | :) | :\| |
| ... | ... | ... | ... | ... | ... | ... | ... |
| • Server N | ○ | ○ | :) | ... | :) | ✗ | :( |
| Overall | :) | :\| | :( | ... | :) | ✗ | :( |

FIG. 6

SYSTEM TO MANAGE AND STORE BACKUP AND RECOVERY META DATA

TECHNICAL FIELD

The invention relates generally to systems and methods for maintaining enterprise data object integrity across distributed storage networks by the use of backup and restoration process, and more particularly to managing such processes and providing meta data about such data objects and processes.

BACKGROUND ART

Modern enterprises, including corporations, public agencies, and other entities, use sophisticated networks of computers and other digital devices. Some of these function as servers to other devices on the network. Such servers typically store data, programs, documents, media content, and other information, which are collectively termed herein "data".

Data stored on servers is at risk of being damaged or destroyed by a wide range of hardware problems, software problems, user errors, or malicious activities. Thus, most enterprises make frequent backup copies of the data stored on servers.

When managing a backup system that maintains backup copies of the data stored within an enterprise, there is a need to present the current status of the backup system in a clear and concise manner to those individuals, such as system administrators, who are responsible for the system. Such presentation of status information is often complicated by the fact that medium or large enterprises often have multiple backup servers, also known as backup management servers (BMSs). Each BMS backs up the data on the servers within the enterprise that are client servers of that backup server.

Another need when managing a backup system is to store information about the data that is backed up, that is, to store meta data, in a manner that does not consume excessive storage space. The meta data typically includes data about backup operations or events that have occurred. The meta data stored may include individual file by file meta data or file details, including the meta data for each backup copy of each file that is stored in each backup management system.

There is also a need to store the meta data in a manner that allows efficient retrieval of every backup and restore event for a particular file, or set of files, that occurred during a particular time period.

Yet another need when managing a backup system is to transfer the meta data across a network to a meta-data server. This transfer should be done in a manner that does not consume excessive network bandwidth. Further, this transfer should be done in a manner that does not compromise the security of the backup servers, which are extremely sensitive because they store all or most of the data that the enterprise stores electronically. Further, this transfer should be done in a manner that does not compromise the security of the meta data that is being transferred, which is also extremely sensitive because it describes the data that the enterprise stores electronically.

There is also a need to reduce the footprint that the process of gathering and storing the meta data has on the resources of the backup management servers, that is, to reduce the impact on the resources of the backup management servers that are consumed in the process of gathering and storing the meta data. These resources include, among others, processor bandwidth, memory allocation, memory bandwidth, storage allocation and storage bandwidth.

Another need when managing a backup system is to recover automatically from problems or exceptions. Exceptions occur when the process of gathering and storing the meta data does not function in a normal or expected manner. Typical causes of exceptions in backup management systems include, but are not limited to: an unstable or unreliable network connection between components of a BMS; a network proxy server that is down or not functioning properly; a network that is saturated by excessive traffic, such as may be caused by malicious activity or viruses, or by reallocating network traffic that is usually handled by a network component that is currently inoperable or down; a network portal server that is down or not functioning properly; or a meta data server that is down.

There is also a need to automatically add and set up or provision a client server after it has been newly added to the enterprise's network. A large enterprise may have 10,000 or more client servers. In such an enterprise, adding new client servers and restructuring or reallocating existing ones may occur on an almost daily basis.

DISCLOSURE OF INVENTION

Accordingly, it is an object of the present invention to provide a system to manage and store backup and recovery meta data.

Briefly, one preferred embodiment of the present invention is a system to manage backup and recovery meta data. A database is provided that includes a schema having a file table, a backup table, and a link table. And a computerized console portal system is provided to accept instruction regarding the meta data from a computerized administrator system.

The other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The drawings illustrate technologies related to the invention, show example embodiments of the invention, and give examples of using the invention. The objects, features and advantages of the invention will become more apparent from the following detailed description when read in conjunction with the following drawings:

FIG. 6 is an exemplary status summary or mission control report according to an embodiment of the invention.

In the various figures of the drawings, like references are used to denote like or similar elements or steps.

BEST MODE FOR CARRYING OUT THE INVENTION

Figure 1:
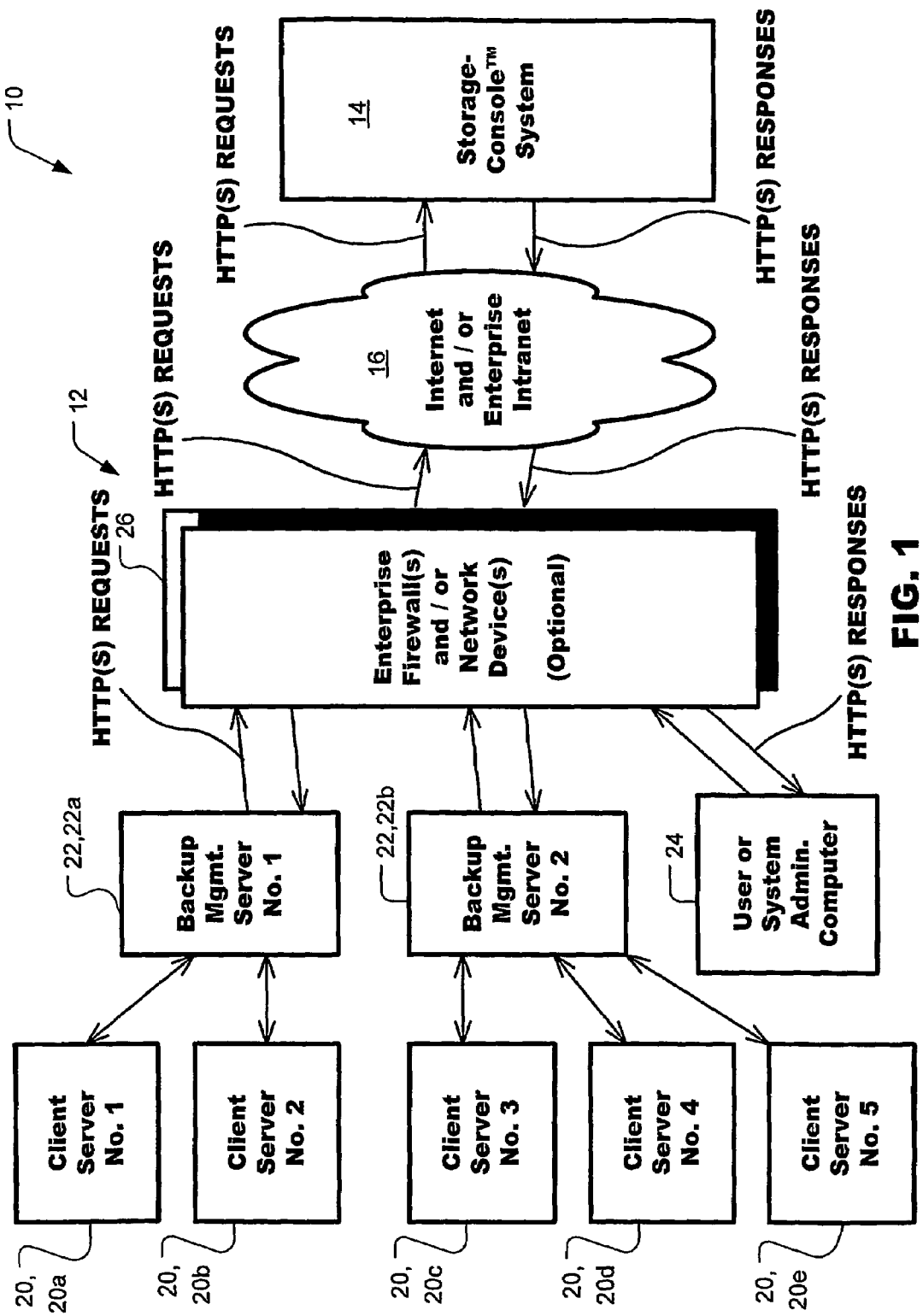
FIG. 1 is a functional block diagram of an exemplary embodiment of the invention, emphasizing aspects within an enterprise network that capture and transmit meta data.

The descriptions and discussions herein illustrate technologies related to the invention, show examples of the invention and give examples of using the invention. Known methods, procedures, systems, circuits, or elements may be described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to agent, demon, symbol, number, byte, communicate, object, procedure, and block. Those skilled in the art use such terms as a convenient nomenclature for components, data or operations within a computer, digital device or electromechanical system. Such components, data and operations are represented by physical properties of actual objects including but not limited to electronic voltage, magnetic field and optical reflectivity. Similarly, perceptive or mental terms including but not limited to detect, sense, recall, present, test, compare, control, process, manipulate, analyze, and determine may also refer to such components, data or operations or to manipulations of such physical properties.

One preferred embodiment of the present invention is a system to manage and store backup and recovery meta data. To simplify the following discussion we generally show the invention in the context of a global backup system (GBS). As illustrated in the various drawings herein, and particularly in the view of FIG. 1, the GBS 10 is depicted by the general reference character 10.

Figure 2:
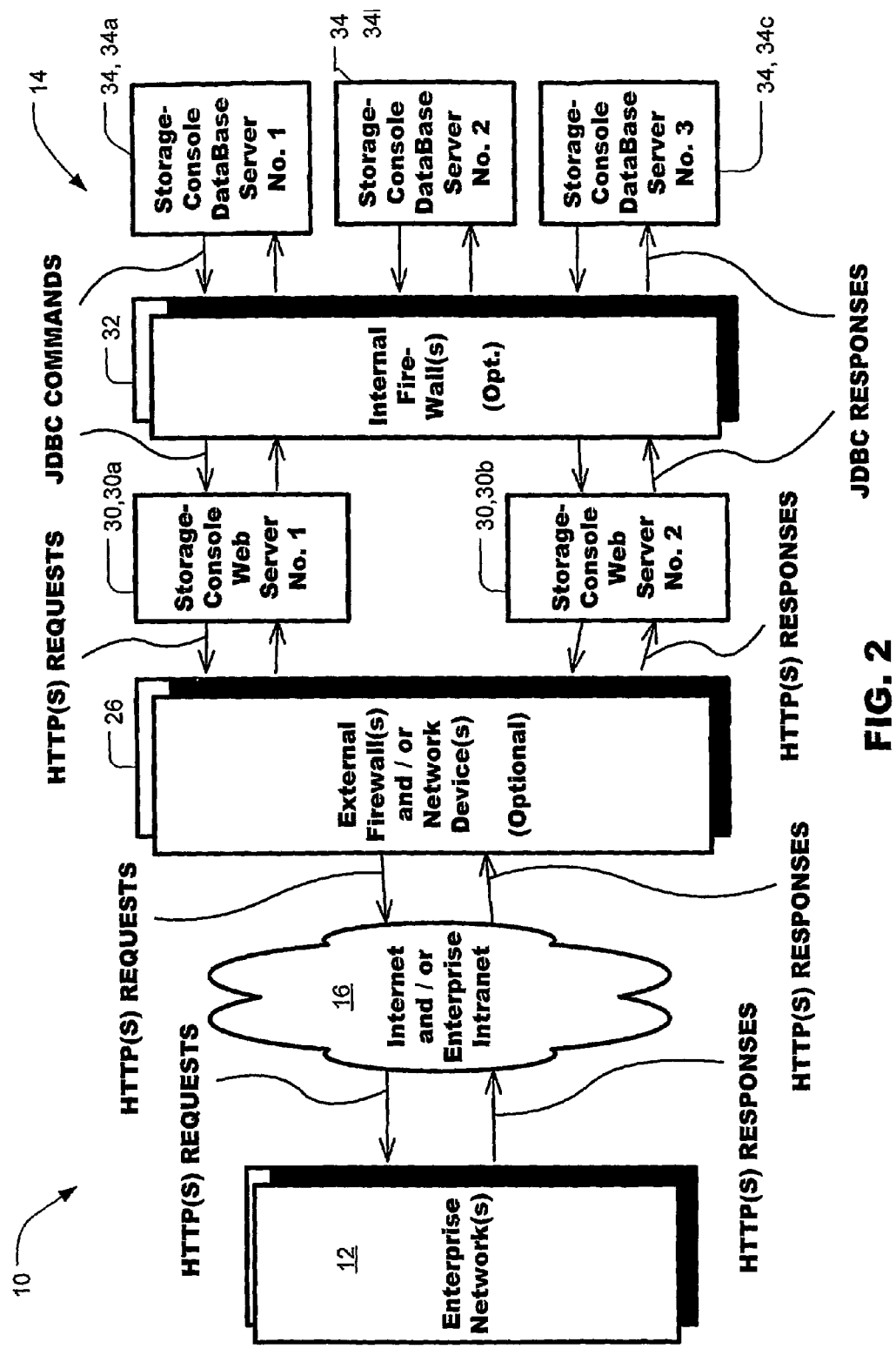
FIG. 2 is a functional block diagram of an exemplary embodiment of the invention, emphasizing aspects within a StorageConsole™ system that persist and manage the backup and recovery meta data of the enterprise.

FIG. 1-2 are functional block diagrams of an exemplary GBS 10 in accord with the present invention. FIG. 1 emphasizes aspects within an enterprise network 12 that are of particular importance to the ability of the GBS 10 to capture and transmit meta data for a typical enterprise. FIG. 2 emphasizes aspects within a StorageConsole™ system (SCS 14) that are of particular importance to the ability of the GBS 10 to persist and manage the backup and recovery meta data of the enterprise. The an enterprise network 12 and the SCS 14 communicate via the Internet and/or an enterprise intranet (generically, an I-net 16).

Turning now to FIG. 1, it shows how client servers 20, backup management servers (BMS 22), an administrator system 24, and optional additional network devices 26 communicate via the I-net 16. For reference, the respective client servers 20 are client servers 20*a-e* and the BMS 22 are BMS 22*a-b*. Some examples of common additional network devices 26 include routers, bridges, and firewalls.

There may by thousands of client servers 20 and BMSs 22 present in a typical enterprise using the GBS 10, and the necessarily simplified embodiments shown in the figures herein should not be interpreted restrictively. For example, two enterprises that use present commercial embodiments of the GBS 10 for their complex network-backup needs are the United States Patent and Trademark Office (USPTO) and Bank of America Corporation (BOA). The USPTO is relatively concentrated geographically, whereas, BOA offices are widely distributed all over the world.

Backup copies of data at the client servers 20*a-b* is backed up by BMS 22*a* and backup copies of data at the client servers 20*c-e* are backed up by BMS 22*b*. Typically, such backups are done on a regular schedule, such as a full copy of all files being made starting at midnight of each working day. Another common schedule is for a full copy of all files to be made weekly or monthly, with incremental daily backups. In an incremental backup, copies are made of only those files that have changed since the last backup—sometimes since the last full backup, sometimes since the last incremental backup.

The BMSs 22 communicate meta data and other backup information to the SCS 14, or to other servers that store this information, in sessions conducted according to the well-known hyper-text transport protocol (HTTP) or the much more secure HTTPS protocol. Generally, all such sessions will be initiated by the respective BMSs 22. This is not a necessary requirement of the GBS 10, however, but rather a matter of prudent network management for security purposes.

Some form of a network connection is typically used to convey information between the BMSs 22 and the SCS 14. In some cases, the SCS 14 is located within an enterprise itself and this communication can occur exclusively over the enterprise's intranet. In other cases, the SCS 14 is located elsewhere and communication occurs over the public Internet. The I-net 16 generically represents these network connections.

Turning now to FIG. 2, the SCS 14 includes more optional network devices 26, StorageConsole web servers (SC portal servers 30), optional internal firewalls 32, and StorageConsole database servers (SC database servers 34). For reference, the respective SC portal servers 30 are SC portal servers 30*a-b* and the SC database servers 34 are SC database servers 34*a-c*.

In some embodiments of the invention, any BMS 22 may access any of the SC portal servers 30; any SC portal server 30 may access any of the SC database servers 34; and the meta data and other backup information associated with a particular BMS 22 may be stored on any one of the SC database servers 34 or such information may be replicated on more than one of the SC database servers 34*a-c* so that there is a fallback to help ensure reliability of the GBS 10.

Typically the SC portal servers 30 are coupled to the I-net 16 via one or more instances of the optional network devices 26 (e.g., routers, switches, or firewalls), however, this is optional. The SC portal servers 30 may be coupled via conventional network equipment to the SC database servers 34, or via the optional internal firewalls 32 for added security. Here as well, multiple instances of similar or identical equipment may be used to have a fallback device available in case of problems, or may be used for balancing network traffic. The optional network devices 26 and internal firewalls 32 and the use of the HTTPS protocol may be less important for communication over a small, private and trusted intranet than for communication that uses the vast, public and interception-prone Internet.

A SC portal server 30 may run on a machine that is separate from the SC database server 34 or both may run on the same machine. If two different machines are used, then one or more of the optional internal firewalls 32 may be used between the machines to increase security. Firewalls are known in the art that can be configured to allow proper database access commands and responses to pass through, but block other messages.

In some embodiments, all communication between the software used and the SC portal server 30 occur via the Java data base connectivity protocol (JDBC). In such embodiments, the internal firewalls 32 can monitor this traffic to ensure that all messages are legal JDBC commands and responses.

With reference briefly also to FIG. 1, users access the GBS 10 via a user or system administrator computer (an administrator system 24) that is coupled to the I-net 16. In FIG. 1-2 the administrator system 24 shown is within the enterprise network 12, but this is not a requirement, and one or more administrator systems 24 can be within the enterprise network 12, within the SCS 14, or otherwise coupled to the I-net 16. A user may be an ordinary or individual user, who accesses the GBS 10 to request that one of his or her files be restored from backup storage. Such a user may also be a system administrator who is responsible for managing backup system in one or more enterprise networks 12 or for managing all or part of the GBS 10.

Figure 3:
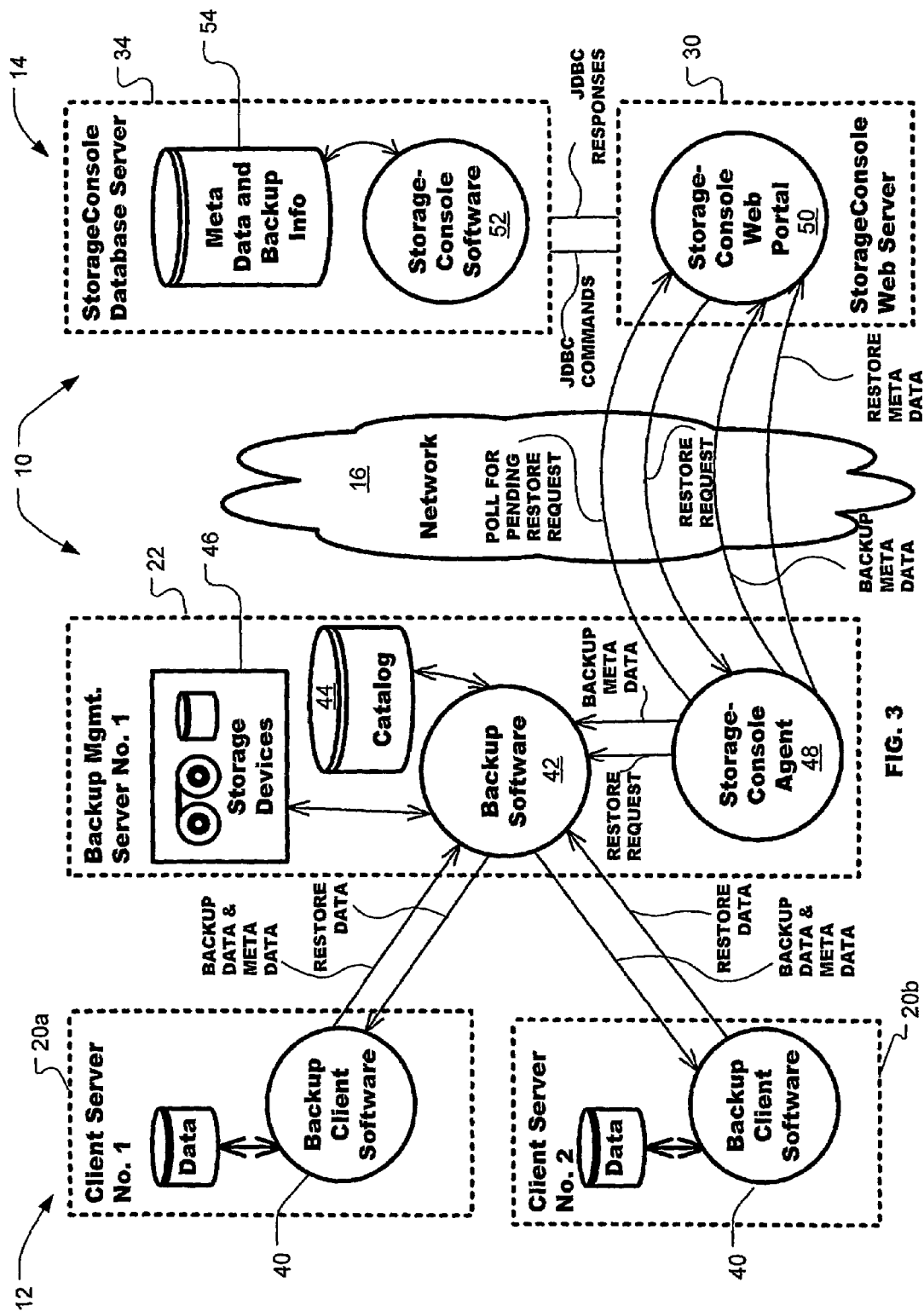
FIG. 3 is a functional block diagram of another exemplary embodiment of the invention, particularly showing the communication paths used between client servers and a backup management server, as well as those used between the backup management server and a SC portal server.

FIG. 3 is a functional block diagram of another exemplary embodiment of a GBS 10, particularly showing the communication paths used between two client servers 20a-b and a BMS 22, as well as those used between the BMS 22 and a SC portal server 30.

Backup events occur periodically. In a backup event, client backup software 40 running on a particular client server 20a-b sends data and meta data to backup server software 42 that runs on an associated BMS 22. Restore events occur on an occasional or as needed basis. In a restore event, data is sent from the backup server software 42 of a BMS 22 back to the client backup software 40 of one of the client servers 20a-b served by that BMS 22. As cannot be overstressed, in a typical large enterprise there may be thousands of client servers 20 and BMSs 22 present. The backup scenario just described can take place thousands of times per day and the restore scenario just described can take place tens or hundreds of times per day.

Various embodiments of the invention may be used in conjunction with various client backup software 40 and backup server software 42. Such software includes but is not limited to: the NetBackup products from VERITAS Software Corporation of Mountain View, Calif.; the LEGATO Net-Worker products from LEGATO Systems, Inc. of Mountain View, Calif.; and the Tivoli Storage Manager products from IBM Corporation.

Typically the data transfer between the client backup software 40 and backup server software 42 occurs via an enterprise intranet such as a local area network (LAN), but wide area networks (WANs), storage area networks (SANs), or other communication channels may also be used.

The backup server software 42 on each BMS 22 receives the backup data and the backup meta data and sends the restore data. Typically, the meta data for each backup and restore event is stored in a catalog that is held on a disk drive 44 within the BMS 22. Typically, the backup data is stored on one or more storage units 46, which may include but are not limited to disk drives, tape drives, or "juke boxes". A juke box holds a library of tapes or other digital media and allows each to be individually selected, automatically positioned to be active, and then read, written or both.

The backup server software 42 interacts with the GBS 10 by providing backup statistics and meta data to a StorageConsole agent (SC agent 48) and by receiving restore requests from the SC agent 48. The SC agent 48 is the software component of the GBS 10 that runs on the BMS. As discussed in detail presently, the SC agent 48 in the inventors' presently preferred embodiment is implemented as three software components that run largely independently.

The backup statistics that are communicated to and stored by the SC database server 34 may include, but are not limited to one or more of: the current inventory of media (tapes or other) held within a BMS 22; the current inventory of storage units 46 (tape drives, disk drives, jukeboxes, or other) that are part of a BMS 22; the current utilization of the media held within a BMS 22; or current utilization of the storage units 46 within a BMS 22.

The SC agents 48 communicate with the SC portal server 30 via initiating HTTP or HTTPS sessions with a StorageConsole web portal (SC web portal 50). These sessions occur over the I-net 16.

Because the communications occur via sessions that use the well-known and commonly used HTTP or HTTPS protocols, no changes are required in routers, bridges, firewalls, etc. (e.g., the optional network devices 26 shown in FIG. 1-2) or in other security policies when the SC agents 48 are installed on BMSs 22. This substantially simplifies installation, both the technical process of installing the SC agents 48 and the managerial or information technology department of obtaining approval for installation of the GBS 10.

Further because communications occur via sessions that use the stateless HTTP or HTTPS protocols, embodiments of the invention employing these protocols can have no communication socket or channel open during or after communication. An open socket that has already been authenticated, verified and allowed access is a major point of vulnerability in the security of a network.

In the inter-process communication scheme depicted in FIG. 3, the BMS 22 becomes a client of the SC portal server 30 by initiating a communication session. But preferably never visa versa. That is, as a strong security practice, the SC portal server 30 need never initiate any communication with a BMS 22. Because the BMS 22 need never responds to a communication session that an external device is attempting to initiate, there is no way that a curious person, a deliberate hacker or any kind of impostor can use such a communication path to compromise the security of the BMS 22. This security feature is very advantageous for enterprises that use the public Internet to communicate their meta data to SC portal server 30.

Nevertheless, this security feature is also advantageous for enterprises that use a private intranet for such communication, in that the feature prevents a user with authorized access to a portion of the enterprise's servers or networks from using the meta-data communication path to illegitimately access other portions of the enterprise's data. Few users, if any, have access to all of the data on all servers of an enterprise.

The SC agents 48 send meta data for each backup event, meta data for each restore event, and backup statistics to the SC web portal 50. Also, the SC agents 48 periodically poll the SC web portal 50 to see if any restore operations have been requested for the BMS 22. If so, they receive the details of what file or files are to be restored from what backup event.

The SC agents 48 may be software that is written in the Java™ programming language. Such SC agents 48 are then more easily ported to BMSs 22 using different operating systems and different processors than SC agents 48 that are written in the C or the C++ programming languages.

In some embodiments of the invention, the Java cryptography extension (JCE), the Java authentication and authorization service (JAAS) or both may be used to implement some of the security, authentication and encryption features of the GBS 10.

In some embodiments of the GBS 10, the Java code that is used in the SC agents 48 is transformed by a process that obfuscates the code, that optimizes the code, or both. Such processes include, but are not limited to those of: the DashO products from Preemptive Solutions, Inc. of Cleveland, Ohio; or the Jshrink product from Eastridge Technology of Princeton, N.J.

The SC web portal 50 is the access point by means of which the SC agents 48 that run on a BMS 22 access the SCS 14. The SC web portal 50 is also an access point by means of which system administrators, ordinary users, or both may access the SC portal server 30.

In embodiments of the invention in which the HTTPS protocol is used, unauthorized access to the SC web portal 50 is prevented, or at least made very improbable, by the security of HTTPS. HTTPS is based on the use of a secure sockets layer (SSL) and on public-key encryption. Some embodiments of this protocol use 128-bit encryption, which makes decrypting of an intercepted message unlikely using any presently known technique.

Some embodiments of the GBS 10 obtain the public key used for this encryption from a digital certificate that authenticates the recipient of a message. A digital certificate is issued, encrypted and signed by a trusted third party. Digital certificates make it highly unlikely that an unauthorized imposture can appear either to the SCS 14 or to one of the BMSs 22 to be the other party in their communication channel.

In addition to or instead of using the HTTPS protocol or server certificates, some embodiments of the GBS 10 use a "magic key" to authenticate the identity of each BMS 22 prior to granting any access to the SCS 14. The magic key is an encoded form of one or more information tokens. At least one of the information tokens used has a unique value for each BMS 22.

Information tokens used to form the magic key may include, but are not limited to: the name of the BMS 22; the network or internet protocol (IP) address of the BMS 22; the name of a server group that includes the BMS 22; a password that is manually entered into both the SC agent 48 and the SC portal server 30 when a BMS 22 is first provisioned; or system identification codes such as serial numbers or device identifiers that are embedded in the hardware or the low-level software of the BMS 22 (e.g., a MAC address).

Various other embodiments of the GBS 10 use other security precautions and procedures. These may include not allowing a user to access the SC web portal 50 until after successful completion of a password protected login procedure. As another example, the SC portal server 30 may include software "trip wires" to detect attempts at unauthorized access.

In the SC database server 34, StorageConsole software (SC software 52) maintains a SC database 54 of the backup and restore meta data, the backup statistics and other relevant backup information. In various embodiments of the GBS 10, this SC database 54 may be: Java data structures; a relational database; a database implemented using the DB2 Universal Database from IBM Corporation; a database implemented using the Oracle9i Database from Oracle Corporation of Redwood City, Calif.; or a database implemented using the SQL Server from Microsoft Corporation.

Figure 4:
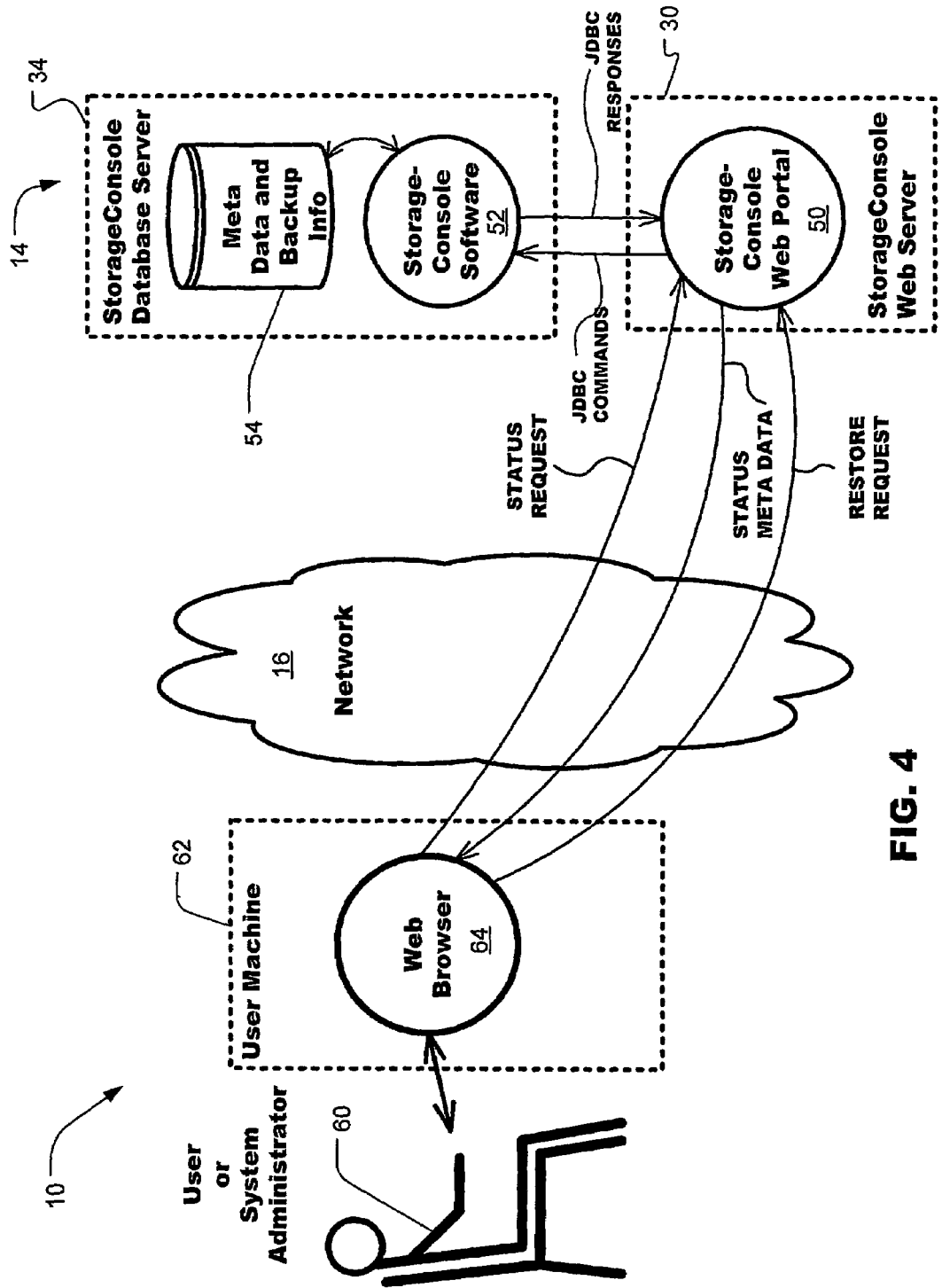
FIG. 4 is a functional block diagram of yet another exemplary embodiment of the invention, particularly showing the communication paths and methods used between the StorageConsole system and the users of an enterprise's computers, servers and networks.

FIG. 4 is a functional block diagram of yet another exemplary embodiment of a GBS 10, this figure particularly showing the communication paths and methods used between the SCS 14 and the users of an enterprise's computers, servers and networks. The user 60, who may be a system administrator or who may simply be interested in requesting the restoration of some of his or her own files, uses a computerized device 62 including a web browser 64 to interact with the SC software 52 via the SC web portal 50. No special software is required on the computerized device 62 employed by the user 60.

When the HTTPS protocol is used, the web browser 64 initiates or handles the authentication, digital certificate and public key encryption involved, typically with little or no involvement of the user 60.

The user 60 may initiate a status request and in response receive the appropriate backup meta data from the SCS 14. The request may be for backup events that include a specific file, files included in a specific backup event, or summary status information including but not limited to a report such as is described with respect to FIG. 6, presently. The user 60 may also initiate a restore request that a specific file or files be restored to a client server 20 from a copy made during a specific backup event.

Figure 5:
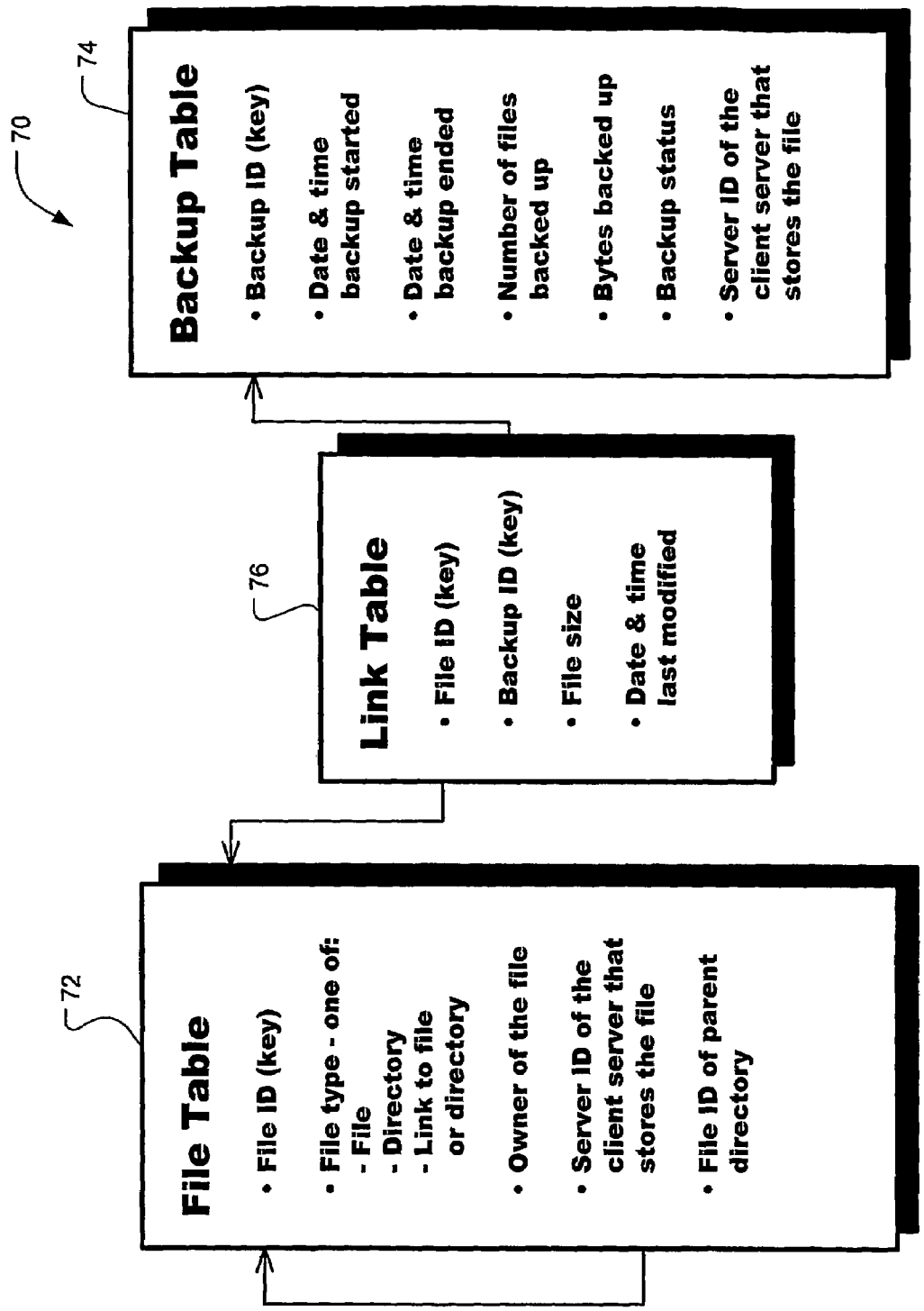
FIG. 5 is a data structure diagram or database schema suitable for storing meta data, including the file details, according to an embodiment of the invention.

FIG. 5 is a data structure diagram or database schema (schema 70) suitable for storing meta data, including the file details, according to an embodiment of the GBS 10. The schema 70 includes a file array or table (file table 72), a backup array or table (backup table 74), and a link array or table (link table 76).

The file table 72 contains one row for each file that is backed up within an enterprise. The information or data fields within each row may differ in various embodiments of the GBS 10. However, a typical set of fields for the file table 72 includes:

(1) A file ID of the file that is represented by this row, which is the key of the file table 72. That is, this is the means by which a particular row can be uniquely identified within and retrieved from the file table 72.

(2) A file type, which is one of "File", "Directory", or "Link to file or directory".

(3) An owner of the file, which is information that can be used to provide accounting information as to which owners are consuming how much of the resources of a client server 20 or of a BMS 22.

(4) A server ID of the client server 20 on which the file is stored.

And (5), A file ID of the file table row for the parent directory that contains this file.

The backup table 74 contains one row for each backup event that is stored within the enterprise's BMSs 22. The information or data fields within each row may differ in various embodiments of the GBS 10. However, a typical set of fields for the backup table 74 includes:

(1) A backup ID of the backup event represented by this row, which is the key of the backup table 74.
(2) A date and time at which the backup event started.
(3) A date and time at which the backup event ended.
(4) A count of the number of files that were backed up in this backup event.
(5) The number of bytes that were backed up in this backup event.
(6) A status for this backup event, including but not limited to "Successful," "Warning", or "Failed"
And (7), A server ID of the client server 20 on which the files backed up are stored.

The link table 76 contains one row for each time that a particular file has been backed up. The information or data fields within each row may differ in various embodiments of the GBS 10. However, a typical set of fields for the link table includes:

(1) A file ID of the file that was backed up.
(2) a backup ID of the backup event during which this file was backed up. Taken together, the file ID and the backup ID constitute the key of the link table 76.
(3) A size of the version of this file backed up in this backup event.
And (4), A data and time at which the version of this file backed up in this backup event was last modified.

The ability to use the schema 70, or a suitable equivalent, is a particularly advantageous feature of the present invention. In a typical enterprise the amount of meta data may be simply staggering. Consider Bank of America Corporation, for instance. It has currently has, roughly, fifteen thousand (15,000) BMSs 22 that perform backup jobs at least monthly or weekly, and more typically daily and even more frequently. The quantity of meta data produced each day alone easily amounts to terabytes, and it needs to be persisted day after day, for months and possibly longer. Providing a database able to store such voluminous data is not a trivial task, and getting any practical utility out of it would be near impossible. Even backing up the backup/restore meta data in such a hypothetical case would be difficult.

What the inventors have appreciated, however, is that vast amounts of the meta not change frequently, if ever. First, files are rarely added or deleted (even considering renaming and deleting files as forms of this). Their "owners" (in operating system access control lists) and identifying characteristics for their client servers 20 and responsible BMSs 22 also rarely change. As one simple other example of redundancy, consider at a listing of names with paths for files in a deeply nested folder structure. All the path information is redundant, yet has to be persisted in some manner. Accordingly, selectively collecting the meta data at the file details level, vetting it, and then storing it in the tables in the schema 70 can facilitate matters considerably.

The GBS 10 permits selectively collecting file details by setting a flag, described in detail elsewhere herein. In many cases administrators and other users will not want file details, as contrasted with success/fail information, backup infrastructure change information (e.g., additions and deletion of client server 20 or storage device 46 changes), and backup policy changes.

It might on initial consideration seem that stripping our redundancy and otherwise manipulating the meta data can be performed at the enterprise network 12, but that often merits deeper consideration. Burdening the SMSs 22 is usually undesirable, and might even interfere with backup and restore operations. And while conserving communication bandwidth is usually a good practice, many enterprises have excess high-speed bandwidth available, particularly at off hours. The GBS 10 can therefore be implemented to stream minimally manipulated meta data to the SCS 14, thus off loading much of the meta data burden from the enterprise network 12. The SCS 14 can manipulated meta data as desired, and can particularly be optimized for this.

The schema 70 then reduces the overall storage burden at the SCS 14. The file table 72 has entries for each file; the backup table 74 has entries for each backup, and the link table 76 has linking these. Thus, as a very simple and simplified example, a file table 72 might have entries for 100 files with the backup table 74 having entries for 90 daily backups of these files. The link table 76 would then have 9,000 entries. The inventors have found that the schema 70 often permits storing the meta data in 10% or less storage that would otherwise be required.

FIG. 6 is an exemplary status summary or mission control report (MCR 80) according to an embodiment of the GBS 10. The first row of the MCR 80 shows the aggregate backup status of a server 1 (i.e., a BMS 22). The second row shows the aggregate backup status of servers 2-5 within a domain A, which in this example happens to be a hierarchical domain. Domain A directly includes servers 2 and 5. Domain A also includes domain B, which includes servers 3 and 4. Thus via the domain hierarchy, domain A also includes servers number 3 and 4.

The next to last row of the MCR 80 here shows the aggregate backup status of a server number N. And the last row shows an aggregate backup status of all the servers and domains included in this MCR 80.

The first column of the MCR 80 shows the aggregate backup status during a custom time interval. The custom time interval may be configured to be, as one example among many, the time interval that started four weeks ago and ended two weeks ago. The second column shows the aggregate backup status during the time interval from two weeks ago to one week ago. The next seven columns show the aggregate backup status during the time intervals that correspond to the last seven days. And the last column shows the aggregate backup status of all time intervals included in this MCR 80.

Within each row and column the appropriate aggregate backup status is shown. The status categories used, as well as the icons used to represent the status categories differ among various embodiments of the invention. However, a typical set of aggregate status icons includes:

(1) A smiley face—representing that all backup and restore events for the corresponding server (or the corresponding domain) scheduled during the corresponding time period were successful.
(2) A neutral face—representing that at least one backup or restore event for the corresponding server (or domain) scheduled during the corresponding time period generated at least one warning.
(3) A frowning face—representing that at least one backup or restore event for the corresponding server (or domain) scheduled during the corresponding time period failed.
(4) A running man—representing that the server currently has a backup or restore event that is currently in process or running.
And (5), An empty circle—representing that no backup or restore events for the corresponding server (or domain) occurred during the corresponding time period.

Figure 7:
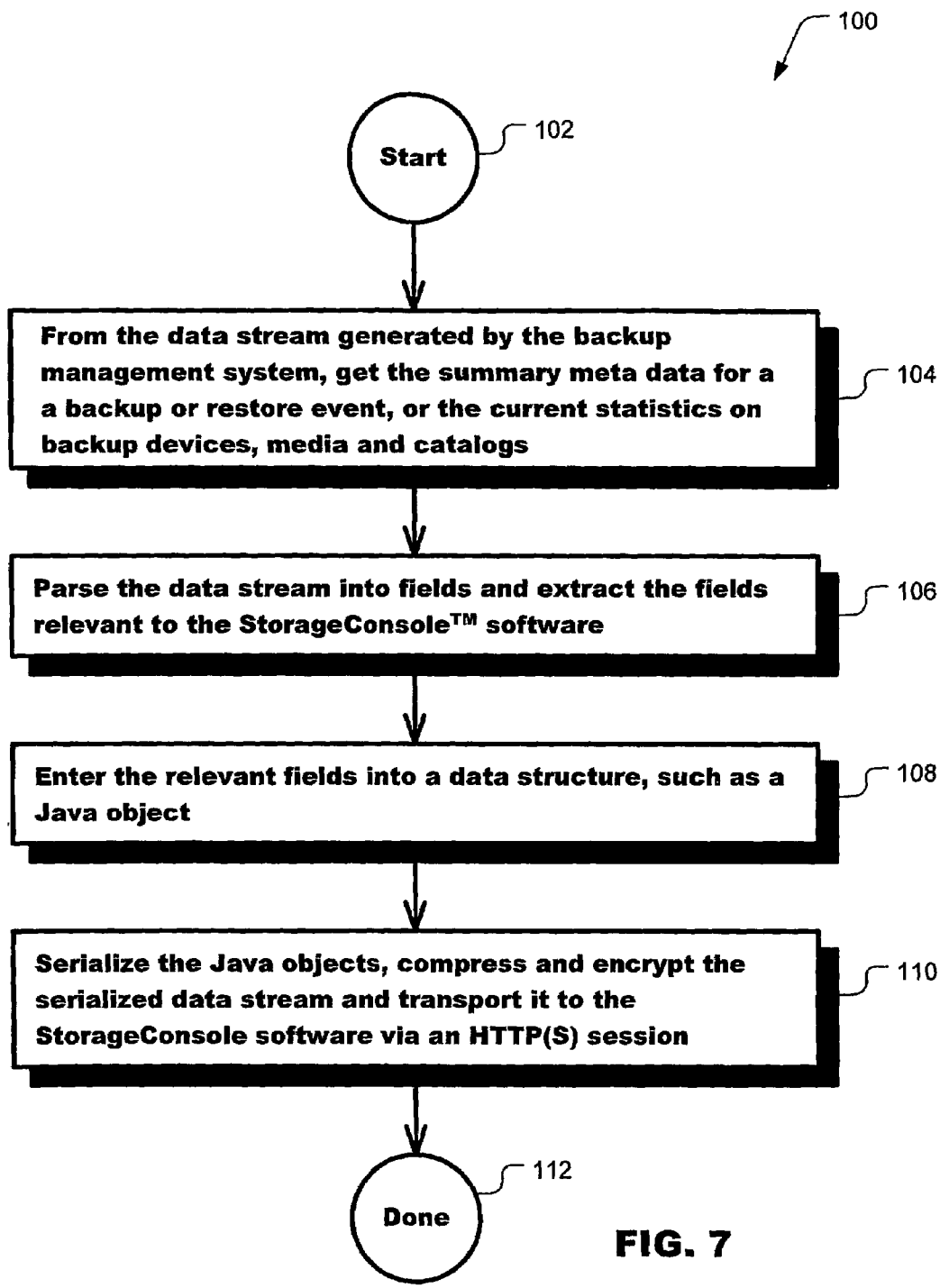
FIG. 7 is a flow chart of a process to capture and transmit backup and recovery meta data according to an embodiment of the invention.

FIG. 7 is a flow chart of a process 100 to capture and transmit backup and recovery meta data according to an embodiment of the GBS 10. In this process 100, summary meta data describing a backup or restore event, or backup statistics, are transferred from the backup server software 42 on the BMS 22 to the SC software 52 at the SCS 14. This transfer occurs via a SC agent 48 that runs on the BMS 22 and an HTTP or HTTPS session over a network such as the I-net 16.

In a step 102, the process 100 starts.

In a step 104, the SC agent 48 obtains, from the data stream generated by the backup server software 42, the summary meta data for backup or restore event, or the backup statistics that are to be sent to and held in the SC database 54.

In a step 106, this data stream is then parsed into fields of meta data or backup statistics.

In a step 108, the fields that are relevant to the GBS 10 are entered into one or more data structures, which may be but are not limited to Java objects.

In a step 110, authentication information, such as a magic key and the objects or data structures representing the relevant fields are serialized and compressed. This compressed serial stream is then sent over the I-net 16 using the HTTP or HTTPS protocol to the SC web portal 50 that is running at the SCS 14. This transfer process is complete as soon as a message from the SC software 52 is received by the SC agent 48 that the information was successfully received.

And in a step 112 the process 100 is done.

Figure 8:
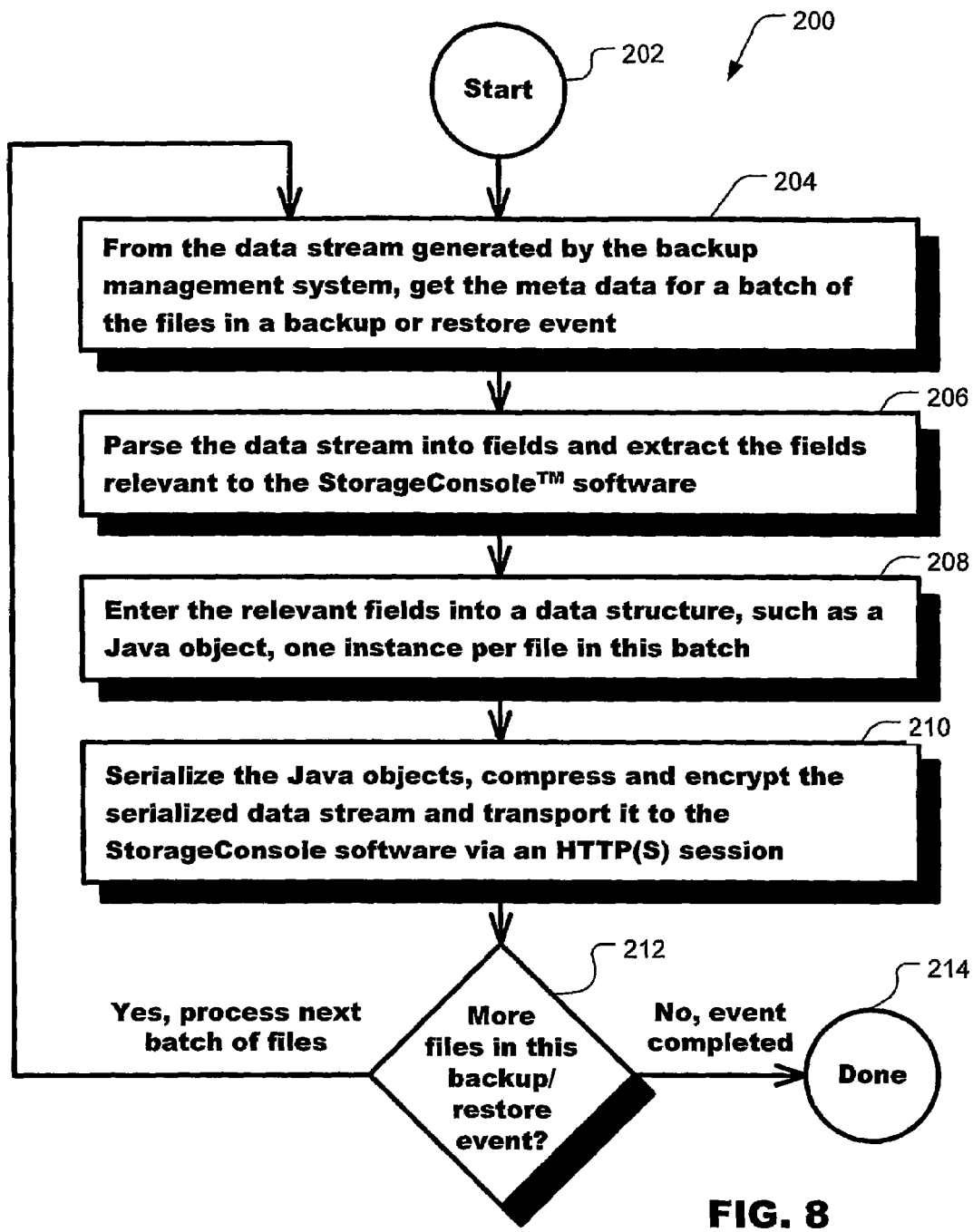
FIG. 8 is a flow chart of a process to manage and store capture and received meta data according to an embodiment of the invention.

FIG. 8 is a flow chart of a process 200 to manage and store capture and received according to an embodiment of the GBS 10. In this process 200, file details of backup or restore meta data is transferred from the backup server software 42 on the BMS 22 to the SC software 52 at the SCS 14. This transfer occurs via a SC agent 48 that runs on the BMS 22 and an HTTP or HTTPS session over a network such as the I-net 16.

In a step 202, the process 200 starts.

In a step 204, the SC agent 48 obtains from a data stream generated by the backup server software 42 the meta data for a batch of files that were involved in the backup or restore event. The number of files processed in a batch, that is the number processed at one time, is configurable, but several thousand files per batch may be a typical value. Upon successful receipt of each batch of meta data, the SC software 52 sends back to the SC agent 48 an acknowledgement message. Thus, the size selected for the batches of files may impact the process of automatically recovering from an exception.

In a step 206, this data stream is then parsed into fields of meta data.

In a step 208, the fields that are relevant to the GBS 10 are entered into one or more data structures, including but not limited to Java objects. Each file may be represented as one instance of the Java object or data structure.

In a step 210, the magic key and the objects or data structures representing the relevant meta data for the batch of files are then serialized and compressed. The compressed, serial stream is sent via the HTTP or HTTPS protocol to the SC web portal 50 that at the SCS 14.

In a step 212, a determination is made if there are more files in the backup or restore event. This process 200 is complete as soon as a message from the SC software 52 is received by the SC agent 48 that the information was successfully received, and in a step 214 the process 200 is done. Otherwise, the process 200 continues at step 204 by looping back to get the meta data for another batch of files as soon as such an acknowledgement is received.

The SC agents 48 may be implemented to be "light weight" or to have a small "footprint" so that they do not consume much of the resources of the BMS 22 on which they run.

The portion of the SC agents 48 handling file details can consume substantial resources of the BMS 22 on which it runs, depending on the number of files for which details must be gathered and transferred to the SCS 14. However, the impact of this is substantially reduced in the GBS 10 by having this portion of the SC agent 48 only execute when a backup or restore event terminates, and not when a polling or request message is received from the SC portal server 30. Such a SC portal server 30 initiated or server pull communication scheme could interrupt the BMS 22 while a backup or restore event is running, at which time the resources of the BMS 22 are heavily utilized and the backup or restore meta data of interest may be incomplete or unavailable.

Preferably, none of the SC agents 48 store data on the BMS 22 on which they run. Of course, the SC agent 48 must itself be stored and information must be maintained while an invocation of it is active, up until an acknowledgement is received of successful communication with the SCS 14. Having the SC agent 48 store any data on the BMS 22 could result in the BMS 22 running out of storage capacity, which could cause performance problems or even cause the BMS 22 to malfunction or crash.

There is a substantial contrast between the footprint of the SC agents 48 on the BMSs 22 on which they run and the footprint of the client backup software 40 on the client server 20 on which it runs. Backup events are typically scheduled when users are at home or not working because much of the disk access bandwidth available on a client server 20 is consumed by a backup event.

Figure 9:
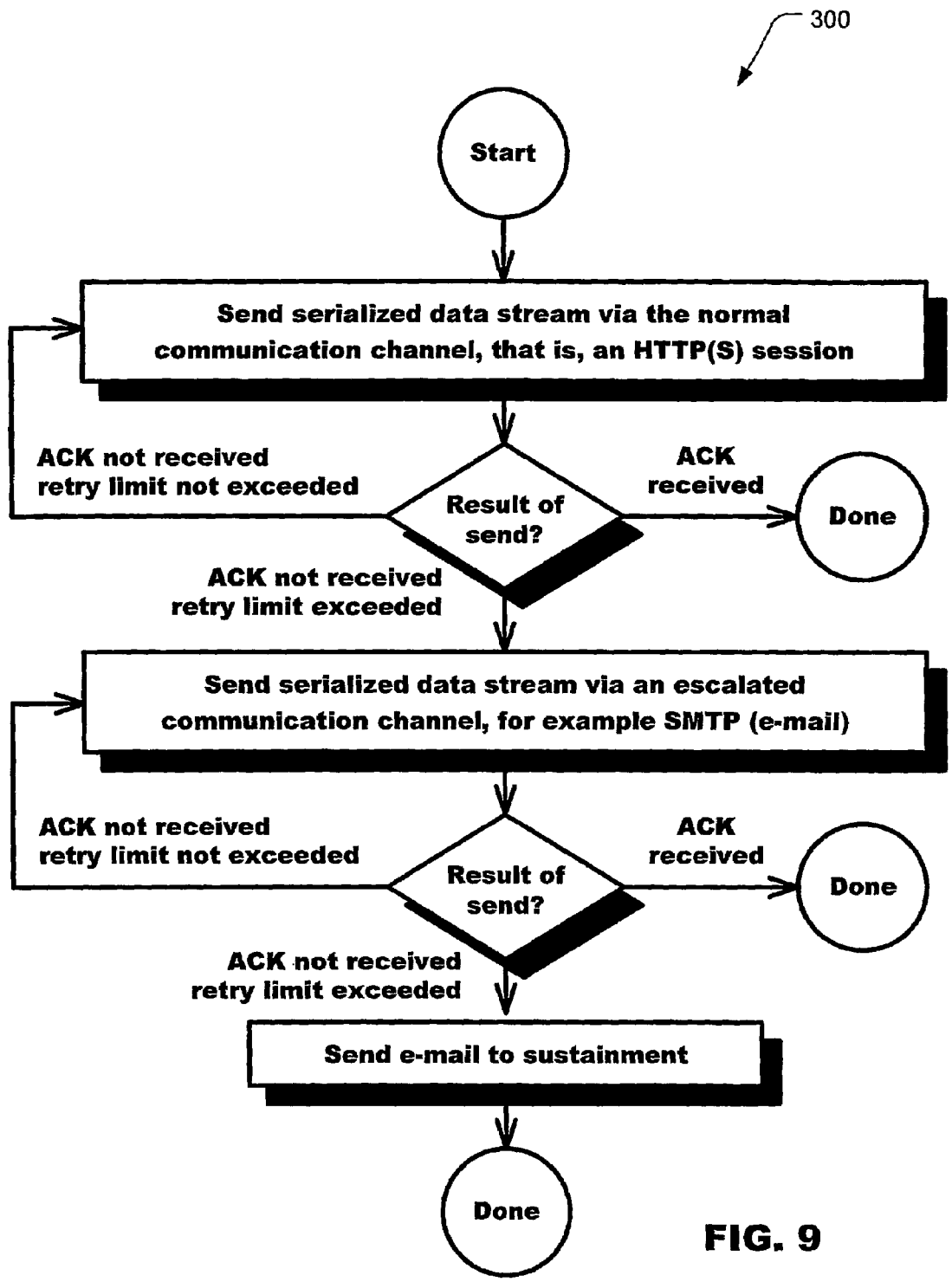
FIG. 9 is a flow chart of a process for handling exceptions according to an embodiment of the invention.

FIG. 9 is a flow chart of a process 300 for handling exceptions according to an embodiment of the GBS 10. This process 300 occurs when a SC agent 48 running on a BMS 22 encounters exception conditions when sending data to the SC software 52 running at the SCS 14.

As discussed above, the normal communication channel between the SC agent 48 and the SCS 14 is for the SC agent 48 to initiate an HTTP or HTTPS session with the SC portal server 30. The SC agent 48 sends to the SC portal server 30 the appropriate meta data or other information, or sends the file details meta data for a batch of the files that are involved in a backup or restore event. Then, the communication stays active within the SC agent 48 until it receives back from the SC portal server 30 a normal acknowledgement message, or an ACK. Typically, the acknowledgement message received is an ACK, indicating that the data has been successfully received and interpreted.

However, various other acknowledgement messages may also be sent from the SCS 14, depending on the information that was sent and on whether it was completely and correctly received. An acknowledgement message may request that the information be resent because it was only partly received or contained errors. An acknowledgement message may request that additional information be sent, as is the case when a newly installed client server 20 is backed up for the first time. It is also possible that no acknowledgement message is received, perhaps because the information sent was not received or was received sufficiently garbled form that the SCS 14 could not correctly identify the sender of the information.

When an ACK is not received or when a resend acknowledgement message is received, the operation of sending the information is then repeated, according to a retry interval and maximum count or according to a schedule of when the communication is to be retried. For example, a retry schedule may call for the first retry to be immediate, and then each subsequent retry to occur after a time interval has elapsed that is longer than the previous time interval. If an ACK is received in response to a retry, then the communication is successful and the process 300 terminates.

When an ACK is not received within the retry limit or maximum retry count, then the SC agent 48 escalates the exception and attempts to send the information via a secondary fallback communication channel. If an ACK is received in response, then the communication is successful and the process 300 terminates.

When an ACK is not received within the retry limit set for this channel, then the GBS 10 may escalate the situation to using a third-level, or even higher-level, communication channel. If an ACK is received in response, then the communication is successful and the process 300 terminates.

Various fallback communication channels are used in various embodiments of the GBS 10, including but not limited to: using an alternative uniform resource locator (URL) or IP address for the SC portal server 30; addressing a fallback SC portal server 30; or sending the information using a protocol that is not HTTP or HTTPS but is equally secure, non-intrusive and light weight, such as the simple mail transfer protocol (SMTP).

When an ACK is not received within the retry limit or maximum count of the highest-level communication channel the SC agent 48 then again escalates the exception. The SC agent 48 sends an e-mail message describing the exception to one or more designated individual or generic e-mail addresses, such as "sys-admin," "customer-exception-report@StorageConsole.com," or "backup-system-sustainment@my-enterprise.com."

Figure 10:
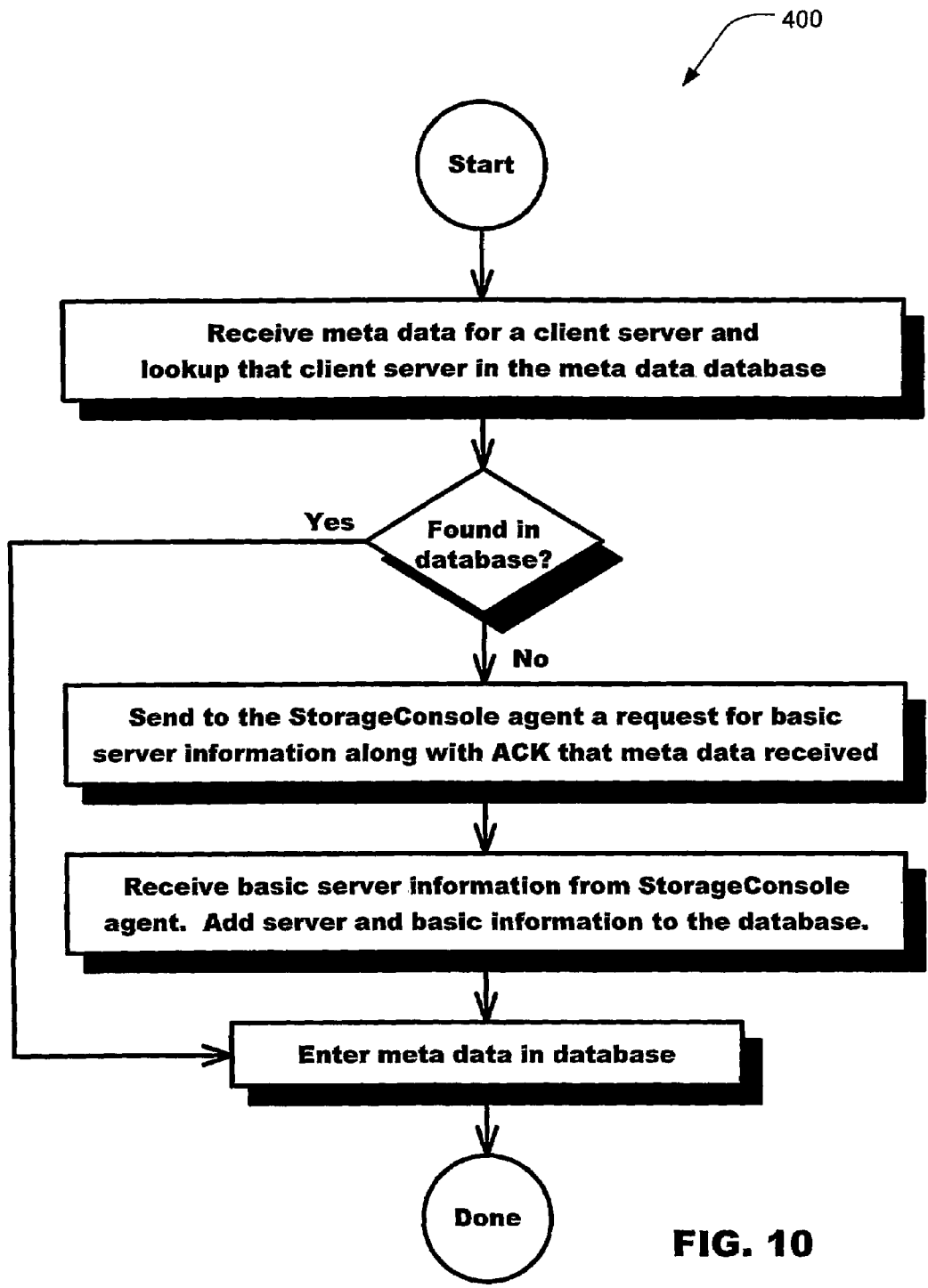
FIG. 10 is a flow chart of a process to add a new client server according to an embodiment of the invention.

FIG. 10 is a flow chart of a process 400 to add a new client server 20 according to an embodiment of the GBS 10. This process occurs when the SC software 52 running at the SCS 14 automatically provisions a client server 20 that has been newly added.

The SC software 52 detects that a client server 20 has been newly added when a SC agent 48 sends backup or restore meta data pertaining to files stored on that BMS 22. When meta data is received, the client server 20 involved is used as a lookup key in the meta data database. Typically, the client server 20 is found in the database, in which case the newly received meta data is added to the SC database 54.

When the client server 20 is not found in the database, then the SC software 52 sends back to the SC agent 48 a request for basic information about the client server 20. This request is sent along with, and is part of, the acknowledgement message sent in response to receiving the meta data.

In various embodiments of the GBS 10, the basic information may include, but is not limited to, one or more of the following: the name of the new client server 20; the IP address of the new client server 20; the make of the new client server 20, e.g. Sun Microsystems, Dell Computer Corporation, or the like; and the model of the new client server 20, e.g. Sun Fire V1280, PowerVault 725N, or the like. None of this information need be manually entered into the GBS 10.

When the basic information about the newly added client server 20 is received by the SC software 52 from the SC agent 48, then the client server 20 is added to the SC database 54.

The GBS 10 uses a number of configuration settings that can be altered on a system by system basis at the client server 20. These include, but are not limited to: whether or not file details are entered into the SC database 54 for each backup and restore event; what individuals can log into the SC web portal 50 and access the meta data or other information about the new client server 20; and whether or not accounting of backup resource consumption is performed by file ownership. The initial values used for the new client server 20 for these configuration settings are taken from the settings that are established for a default server group within the enterprise.

After the basic information and initial setting values are stored into the SC database 54, the meta data received about the backup or restore event that occurred on the newly added client server 20 is then entered into the meta data database.

The SC agent 48 normally does not need to resend this meta data, but the SC agent 48 may not receive an ACK for the meta data transmission until the GBS 10 has provisioned the newly added client server 20 and successfully stored the meta data received.

Figure 11:
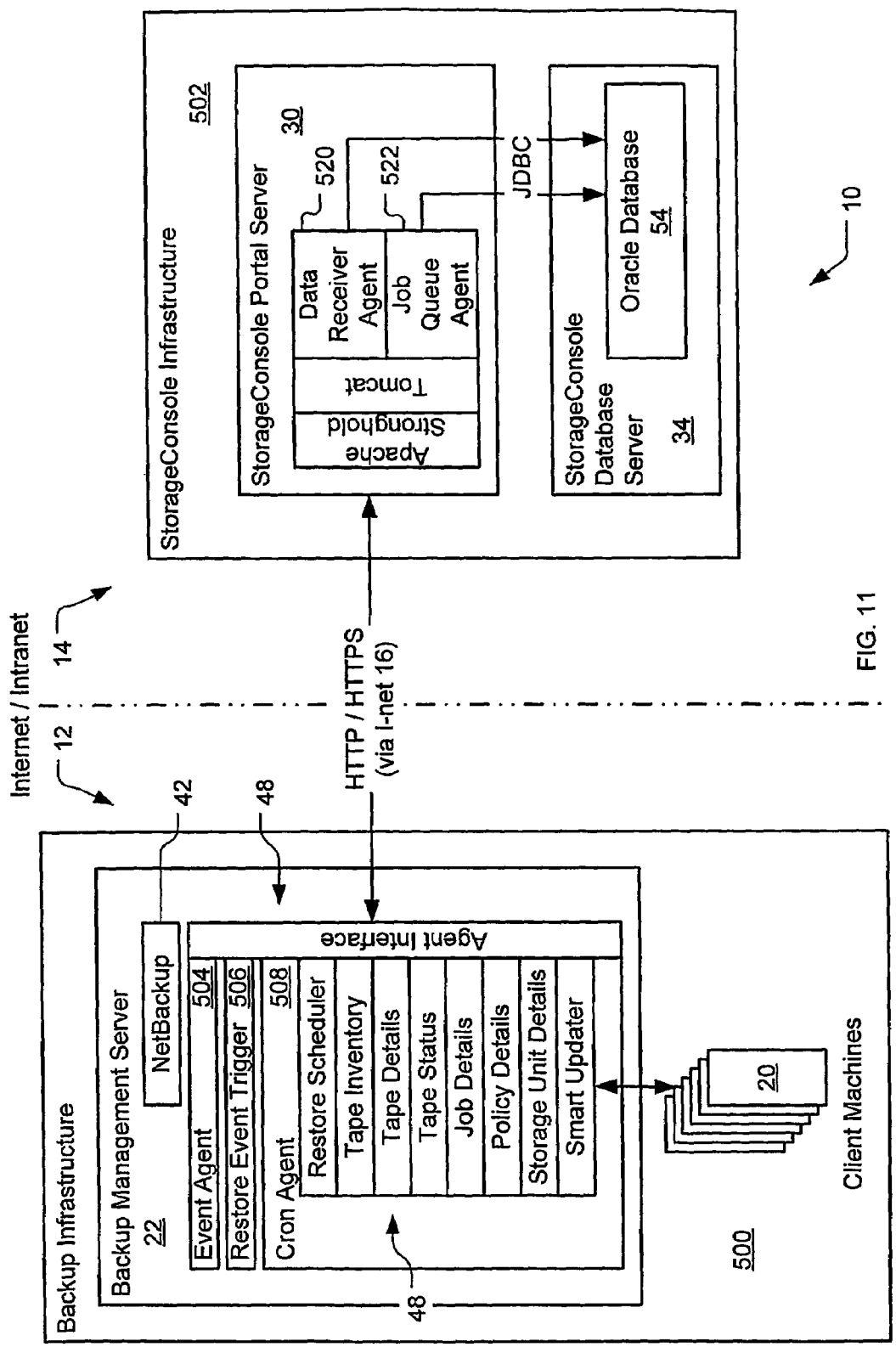
FIG. 11 is a block diagram showing an architectural overview of the infrastructure of an exemplary embodiment of the invention.

FIG. 11 is a block diagram showing an architectural overview of the infrastructure of an exemplary GBS 10. There are two main infrastructure components: the backup infrastructure 500 and the StorageConsole infrastructure (SC infrastructure 502). These two components can reside within a single enterprise or they can be decoupled, with the SC infrastructure 502 residing within one server enterprise and the backup infrastructure 500 residing in one or more number of client enterprises.

As noted above, in the inventors' presently preferred embodiment the enterprise networks 12 (i.e., in the backup infrastructure 500) each include a SC agent 48 that is actually three major agents: an event agent 504, a restore event trigger 506, and a cron agent 508. A data receiver agent 520 is used within the SCS 14 (i.e., in the SC infrastructure 502). Collectively, these agents aid in the data collection, data consolidation and data mining of information from BMSs 22 running various backup server software 42, which includes but is not limited to Veritas NetBackup which is used for the sake of example here. The SC agent 48 interfaces and with the backup server software 42, to obtain the data utilized by the SC web portal 50 (see e.g., FIG. 3).

In the backup infrastructure 500 of the GBS 10 the event agent 504, the restore event trigger 506, and the cron agent 508 (comprising the SC agent 48) reside on the BMS 22 to gather data based on activities performed by the backup server software 42.

The event agent 504 is implemented as a standalone Java daemon process which waits for backups to be completed by the backup server software 42. As needed, the backup server software 42 is configured to write backup event parameters to a log file at the end of a backup event completion. This log file is monitored by the event agent 504. As soon as a new entry is made in the log file the event agent 504 starts to collect all of the information pertaining to the backup job by calling the relevant NetBackup command line interfaces. For access authentication purposes, a magic key is added to the information collected. The information and key are then packaged into Java Objects, serialized, compressed and transported to the data receiver agent 520 over HTTP/HTTPS. The data receiver agent 520 thus receives the information pertaining to the backup job just performed by the backup server software 42.

When a restore job being is undertaken, the backup server software 42 is configured to call the restore event trigger 506, which collects information pertaining to the restore job and sends it to the data receiver agent 520.

The restore event trigger 506 as a process is event driven, in the sense that instances of it are transient processes. They startup, perform the required operation, and terminate, thus imposing minimum load on the BMS 22.

The cron agent 508 is implemented as a standalone Java daemon process that spawns threads based on the jobs declared in a crontab file the GBS 10 maintains. The cron agent 508 currently spawns five threads, one each for five jobs or child agents (child agents 510), discussed presently.

The SC software 52 includes Java servlets residing on the SC Portal server 30. These respond to requests from event triggers from the event agent 504 and the restore event trigger 506 and the child agents 510 of the cron agent 508 that reside on the BMS 22 as parts of the SC agent 48.

The data receiver agent 520 is one such Java servlet. It is configured to listen for requests from the event triggers 504, 506 and child agents 510 on the BMSs 22. On receiving a request, the data receiver agent 520 decodes the information and determines what type of request it has. Once the type of the message has been deciphered, the data in it is authenticated, decompressed, de-serialized and persisted into the SC database 54.

A job queue agent 522 is the other major Java servlet residing on the SC Portal server 30. The job queue agent 522 gets polled by other agents, such as the restore scheduler child agent 510 to initiate new restore jobs, which the initiating agents then process and perform. The job queue agent 522 is configured to return restore jobs that are pending for execution on the BMS 22. The restore jobs are packaged into an XML document, and transferred to the restore scheduler child agent 510 in the cron agent 508. The restore scheduler child agent 510 in turn processes the restore jobs one at a time, and sends back the job status to the job queue agent 522, which then are persisted into the SC database 54.

The GBS 10 employs an architecture that provides a unique way of handling backup server software 42 from different backup software vendors. Each major backup software vendor today uses a non-standard interface to its application. Further, even these applications are not entirely consistent from version to version. These factors pose a huge obstacle for enterprises that have different backup software to contend with. And they pose an even greater problem to a system like the GBS 10, since it has to contend with this variety of backup server software 42 and do so seamlessly from a user's perspective.

One approach would be to write code to make the SCS 14 interact independently with each type of backup server software 42. However, this would increase development cycle time, and also propagate increase in design, testing, and maintenance cycles. Instead, the inventors have crafted an adaptor architecture to reside in the enterprise network 12 and provide the SCS 14 with a single interface to the various backup server software 42.

Figure 12:
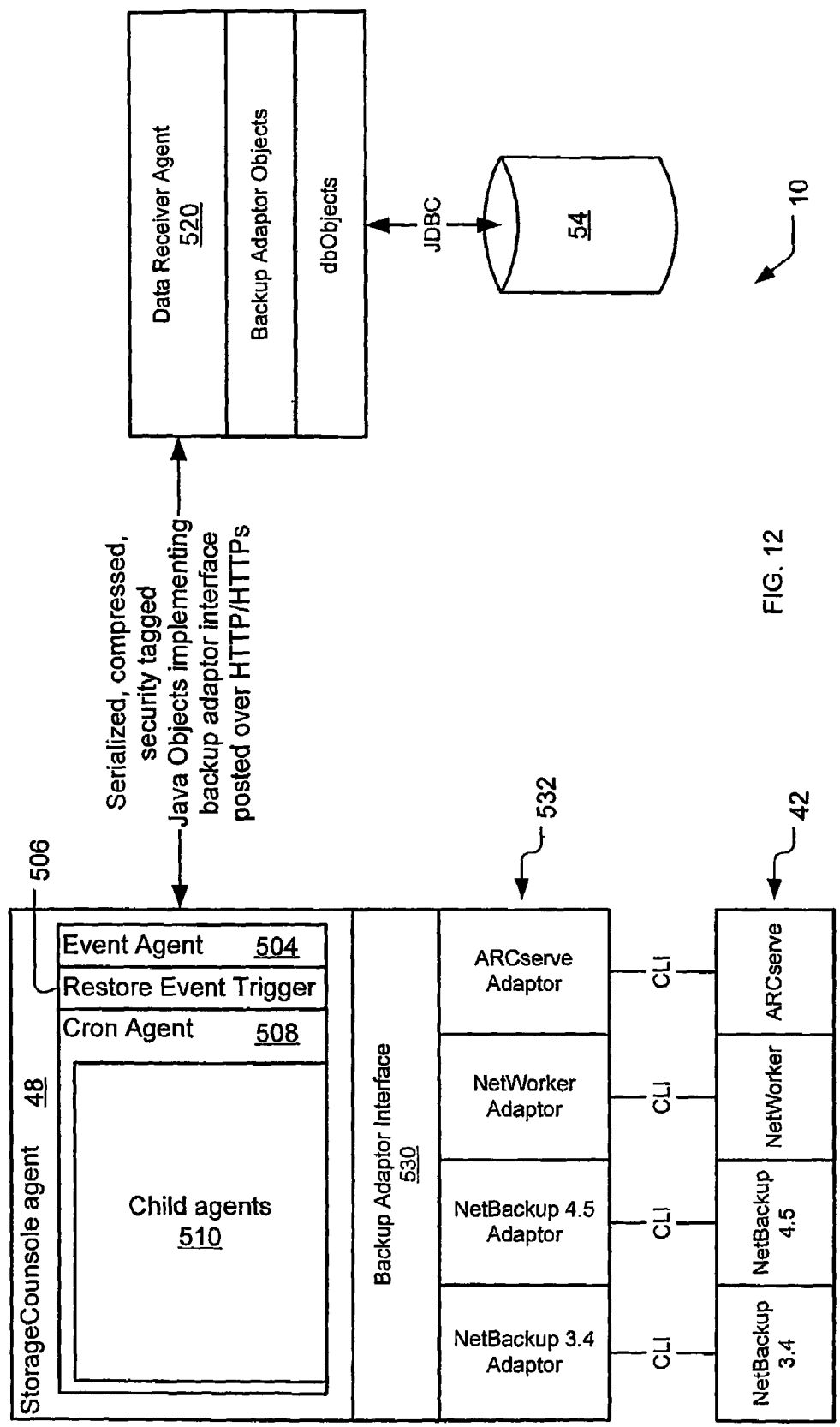
FIG. 12 is a block diagram showing another architectural overview of an exemplary embodiment of the invention.

FIG. 12 is a block diagram showing another architectural overview of an exemplary GBS 10. A single interface show here as a backup adaptor interface 530 exposes methods to a wide range of objects and operations, which are standard components of the backup server software 42, such as standard Backup Event, Restore Event, Backup Policy, Drives, Tapes, etc. components.

Because the backup adaptor interface 530 is well defined, sub-adaptors 532 for each of the various backup software applications can easily be developed. These sub-adaptor 532 objects implement methods defined by the backup adaptor interface 530, and interact with a respective backup product (backup server software 42 instance) by calling the product's command line interface (CLI). A sub-adaptor 532 object decodes the data returned by calls to the CLI and populates this data into fields defined by the backup adaptor interface 530.

This architecture minimizes changes to the SCS 14, in the event that an underlying backup product changes. Additional backup products can also easily be supported by developing new sub-adaptors 532 as new backup products emerge.

Turning now to the event agent 504, the backup server software 42 is configured so that a backup event trigger is called in the event of a backup job being completed. This backup event trigger in turn collects all the information pertaining to the backup job by calling relevant command line interfaces to the backup server software 42. The information collected is next packaged into Java Objects, serialized, magic keyed, compressed and transported to the data receiver agent 520, thus providing the data receiver agent 520 with the information pertaining to the backup job.

FIG. 13A-D are a flow chart depicting an example backup process 600 using NetBackup as exemplary backup server software 42. In a step 602, a backup job is performed on a BMS 22 using NetBackup. In a step 604, NetBackup completes the backup job and calls a script (e.g., "$NETBACKUP_HOME/backup_exit_notify") that writes the client name, class label, schedule label, schedule type, status and stream number to a log (e.g., "$APTARE_HOME/mbs/logs/backups.1st"). In step 606, the event agent 504 monitors the log. If the event agent 504 observes an addition to the log, it reads the backup parameters, initializes a backup driver, and starts a new thread to process this backup event.

In a step 608, the backup driver initializes a BackupEvent object and in a step 610 the BackupEvent object makes a determination if the backup job was successful.

If the job is determined to be successful, in a step 612 the BackupEvent object calls the NetBackup command line interface (CLI) to query data about the backup job and sets its status to "Success". In a step 614 the BackupEvent object populates itself with the backup job data. Alternately, if the job is determined to be unsuccessful, in a step 616 the BackupEvent object sets its status to "Failed".

Then, in a step 618, a BackupDetailsGenerator initializes connection to the data receiver agent 520 running on the SC portal server 30 and in a step 620 data transfer commences in an iterative manner as long as the transfer is successful or a loop count is less than a pre-set max error count (a "while condition").

In a step 622, the BackupEvent object is transferred to the data receiver agent 520 and the data receiver agent 520 processes the data and sends back an acknowledgement (ACK).

In a step 626, a determination is made if the ACK indicates the status of the BackupEvent object is "Success". If so, in a step 628 a branch (1a) is followed, described presently. Otherwise, in a step 630 a determination is made if the ACK indicates an invalid server exception or an invalid IP address exception. If so, in a step 632 a branch (2) is followed, described presently. Otherwise, in a step 634 a determination is made if the ACK indicates an invalid policy name exception or an invalid schedule name exception. If so, a sub-process 636 is called to collect backup policy data, also described presently. And otherwise, step 620 is returned to for another iteration (L loop).

Picking up now with the branch (1a) in step 628, this leads to a step 640 where a determination is made if file level details are to be collected from the BMS 22. One way to do this is to store flags in the SC database 54. Flags can indicate whether as little as one particular file or as much as all of the files and folders under a BMS 22 are of interest. Of course, many millions of files and folders will usually be under a single BMS 22 and billions may be present in even a medium sized enterprise, so setting the flags permits administrators to configure the GBS 10 as they feel efficient and necessary.

If the ACK contains a flag indicating the BMS 22 has file level details, a sub-process 642 is called to collect the file level details, discussed presently. Otherwise, in this implementation, the sub-process 636 is here also called to collect backup policy data and, after that, in a step 644 the process 600 terminates.

Picking up again in step 620, only now considering the case that the "while condition" is not met, in a step 650 a determination is made if transfer has not been successful and the loop count is equal or greater than the pre-set max error count (i.e., that here has been a serious failure). If so, in a step 652 an e-mail advisement is sent to an appropriate party, and step 644 is proceed to, where the process 600 terminates.

Picking up finally with the branch (2) in step 632, this also leads to step 652, from there to step 644 and termination of the process 600.

Figure 13A:
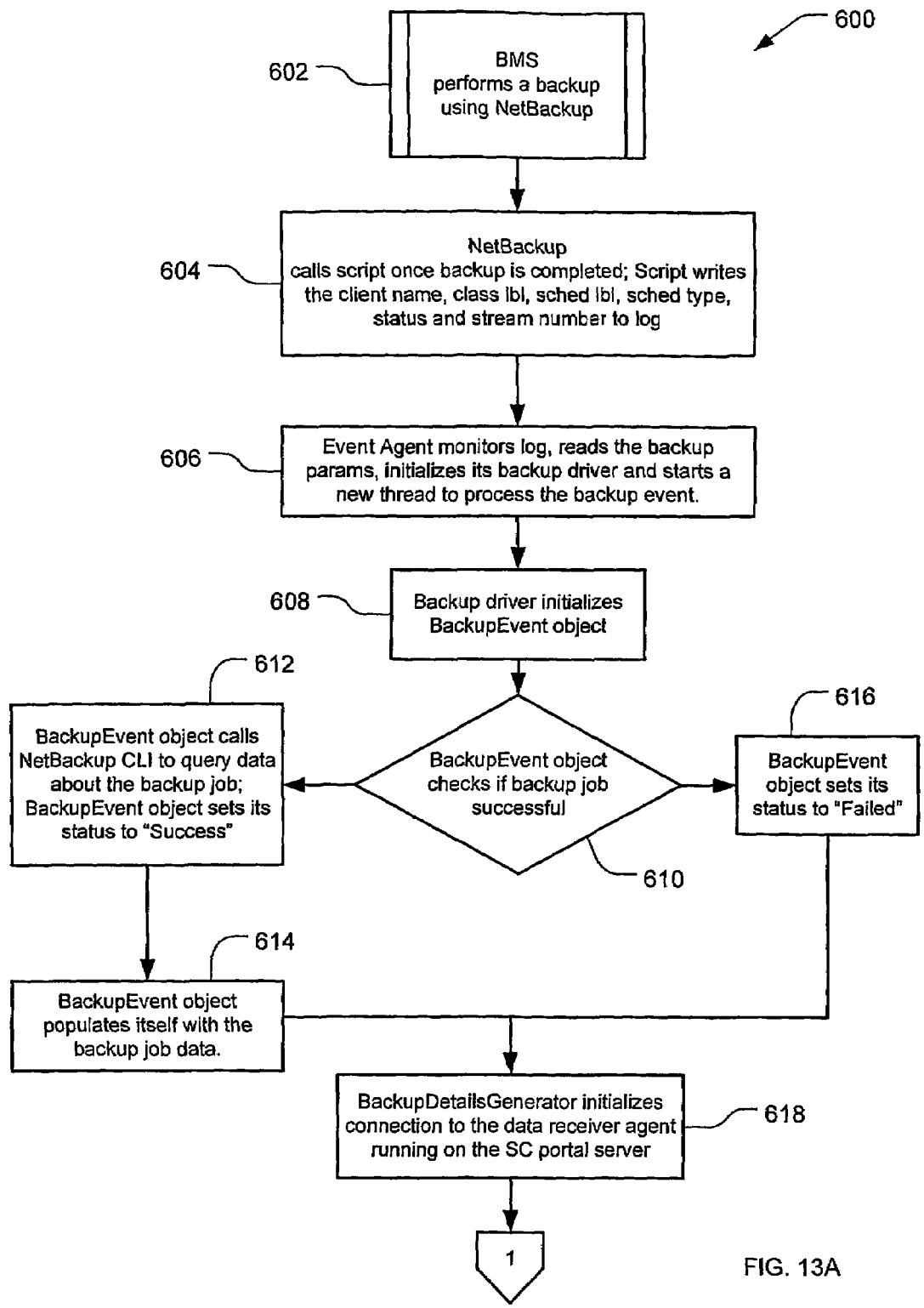
FIG. 13A-D are a flow chart depicting an example backup process using NetBackup as exemplary backup server software.
Figure 13B:
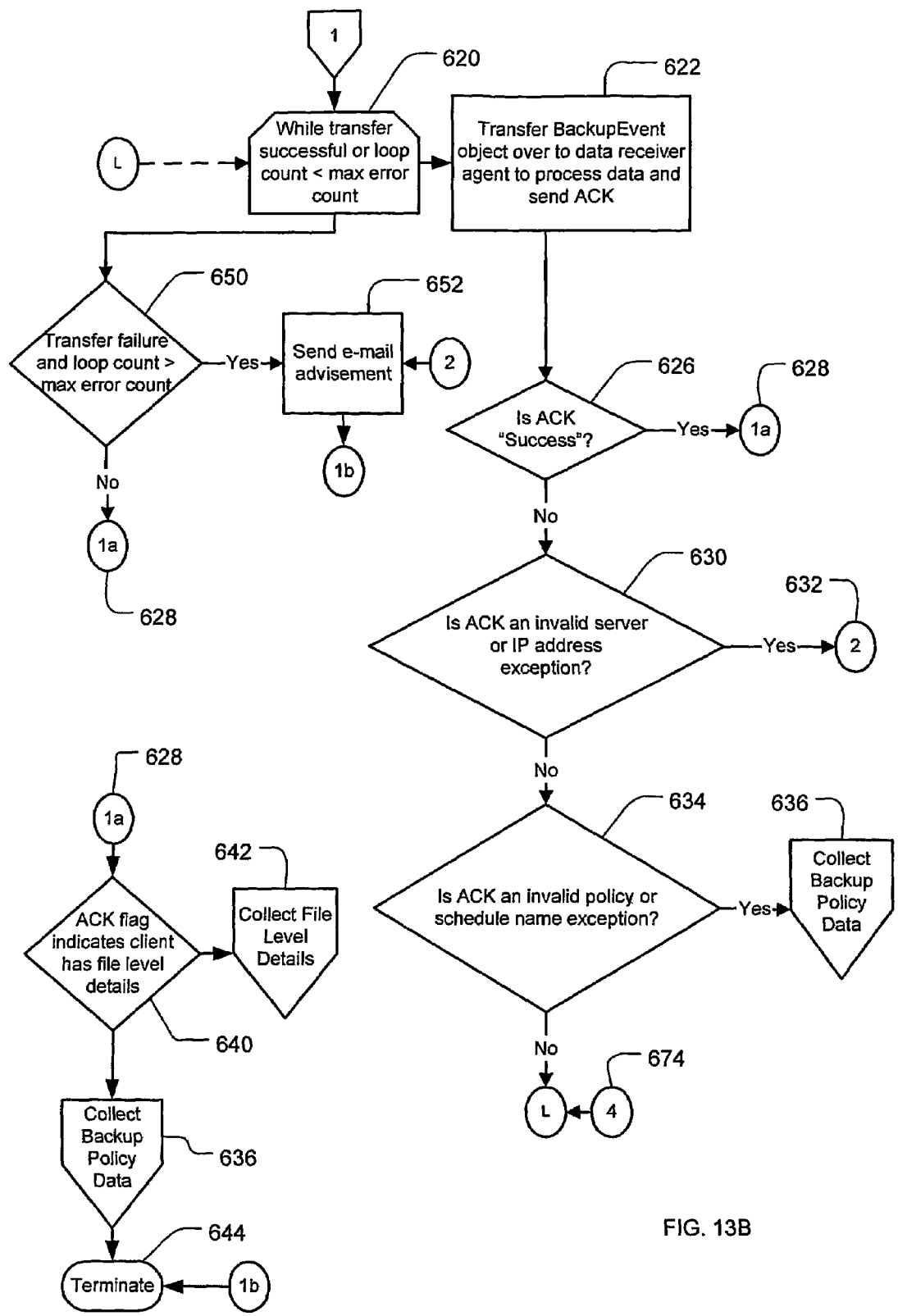
Figure 13C:
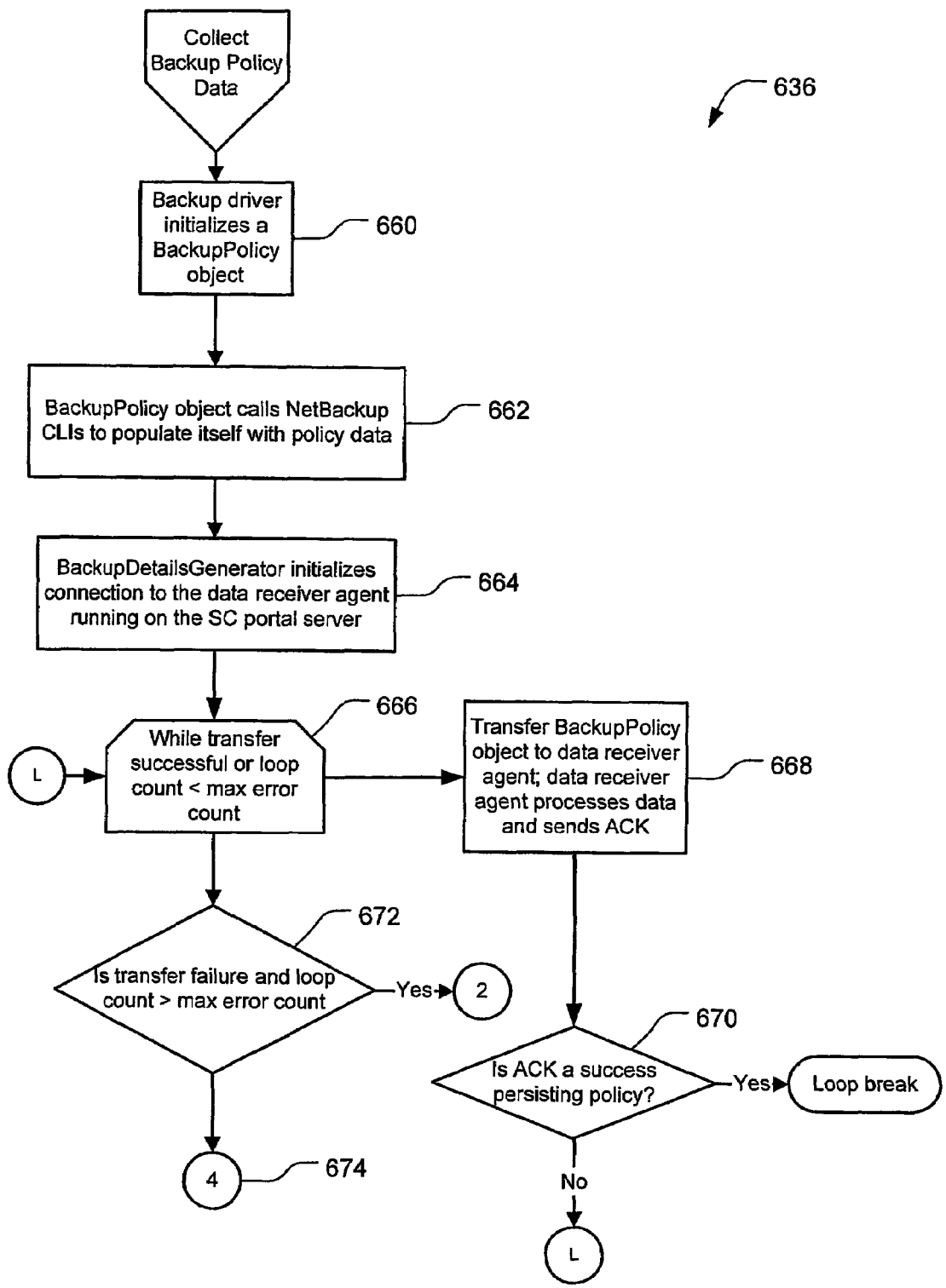

FIG. 13C particularly shows the sub-process 636 that collects backup policy data. In a step 660, the backup driver (at the BMS 22) initializes a BackupPolicy object. In a step 662, the BackupPolicy object calls NetBackup CLIs to populate itself with policy data. And in a step 664, the BackupDetailsGenerator initializes connection to the data receiver agent 520 running on the SC portal server 30.

In a step 666, data transfer commences in an iterative manner as long as the transfer is successful or a loop count is less than the pre-set max error count (a "while condition").

In a step 668, the BackupPolicy object is transferred to the data receiver agent 520, which processes the data and sends back an acknowledgement (ACK).

In a step 670, a determination is made if the ACK indicates success in persisting the policy data into the SC database 54. If so, the sub-process 636 is finished. Otherwise, step 666 is returned to for another iteration (H loop).

Picking up again in step 666, only now considering the case that the "while condition" is not met, in a step 672 a determination is made if transfer has not been successful and the loop count is equal or greater than the pre-set max error count (i.e., that here has been a serious failure). If so, the branch (2) to step 652 (FIG. 13B) is followed. Otherwise, in a step 674 a branch (4) is followed that leads out of the sub-process 636 to step 618 (FIG. 13B) in the main part of process 600.

Figure 13D:
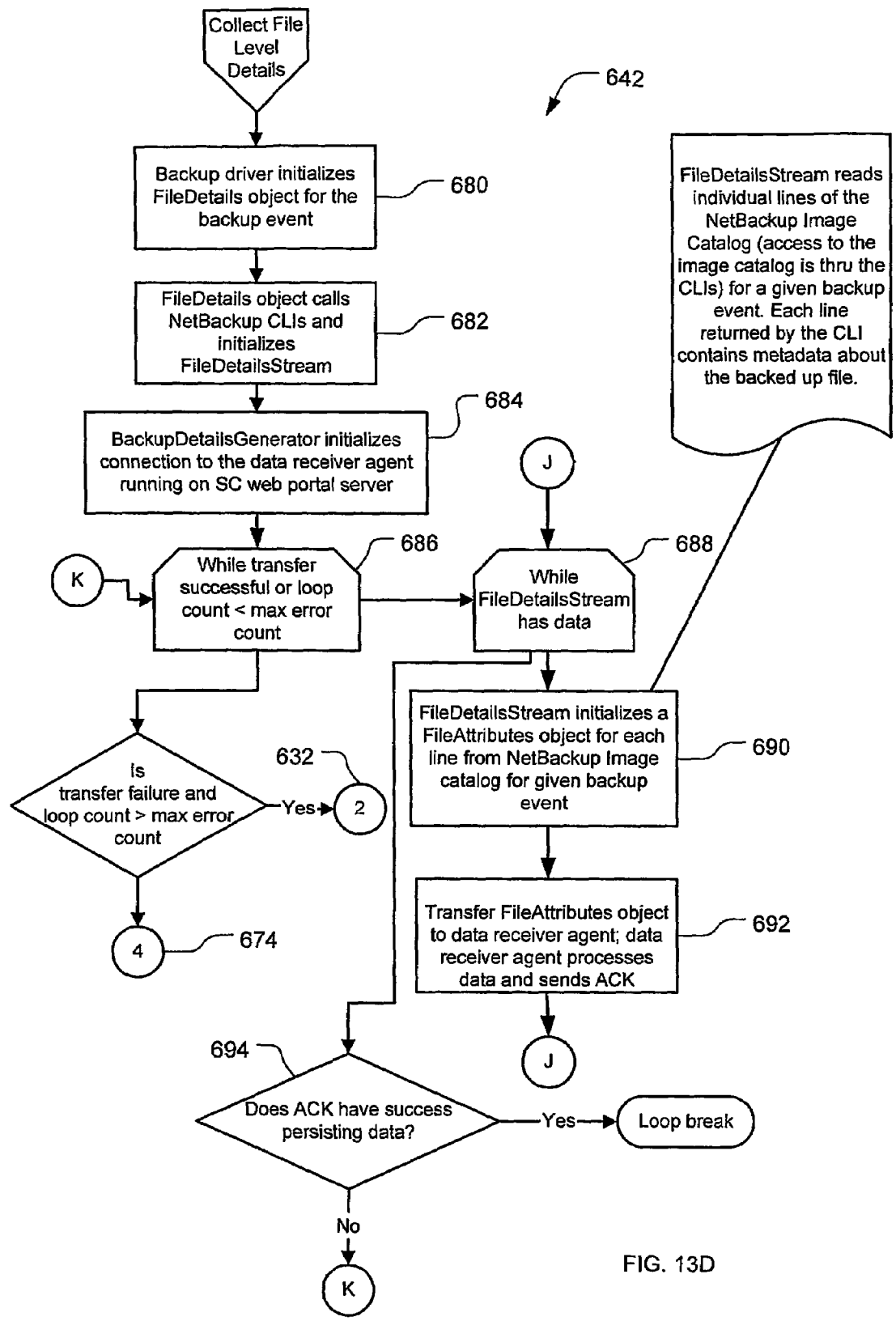

FIG. 13D particularly shows the sub-process 642 is called that collects the file level details. In a step 680, the backup driver (at the BMS 22) initializes a FileDetails object. In a step 682, the FileDetails object calls NetBackup CLIs and initializes a FileDetailsStream. And in a step 684, the BackupDetailsGenerator initializes connection to the data receiver agent 520 running on the SC portal server 30.

In a step 686, data transfer commences in an iterative manner as long as the transfer is successful or a loop count is less than the pre-set max error count (a "while condition").

In a step 688, data transfer continues in an iterative manner as long as the FileDetailsStream has data (also a "while condition"). In a step 690, the FileDetailsStream initializes a FileAttributes object for each line from the NetBackup Image catalog for the given backup event, and in a step 692 the FileAttributes object is transferred to the data receiver agent 520, which processes the data and sends back an acknowledgement (ACK). And then step 688 is returned to for another iteration (J loop).

Next considering the case of data no longer being present in the FileDetailsStream, in a step 694 a determination is made if the ACK indicates success in persisting the data into the SC database 54. If so, the sub-process 642 is finished. Otherwise, step 686 is returned to for another iteration (K loop).

Picking up again in step 686, only now considering the case that the "while condition" there is not met, in a step 696 a determination is made if transfer has not been successful and the loop count is equal or greater than the pre-set max error count (i.e., that here has been a serious failure). If so, the branch (2) to step 652 (FIG. 13B) is followed. Otherwise, in step 674 the branch (4) to step 644 is followed that leads out of the sub-process 642 to step 618 (FIG. 13B) in the main part of process 600.

Turning now to the restore event trigger 506, the backup server software 42 is configured to call the restore event trigger 506 in the event of a restore job being completed. The restore event trigger 506 in turn collects all the information pertaining to the Restore Job by calling relevant command line interfaces (CLIs) to the backup server software 42. The information collected is then packaged into Java Objects, serialized, magic keyed, compressed and transported to the data receiver agent 520, thus providing the data receiver agent 520 with the information pertaining to the backup job.

Figure 14A:
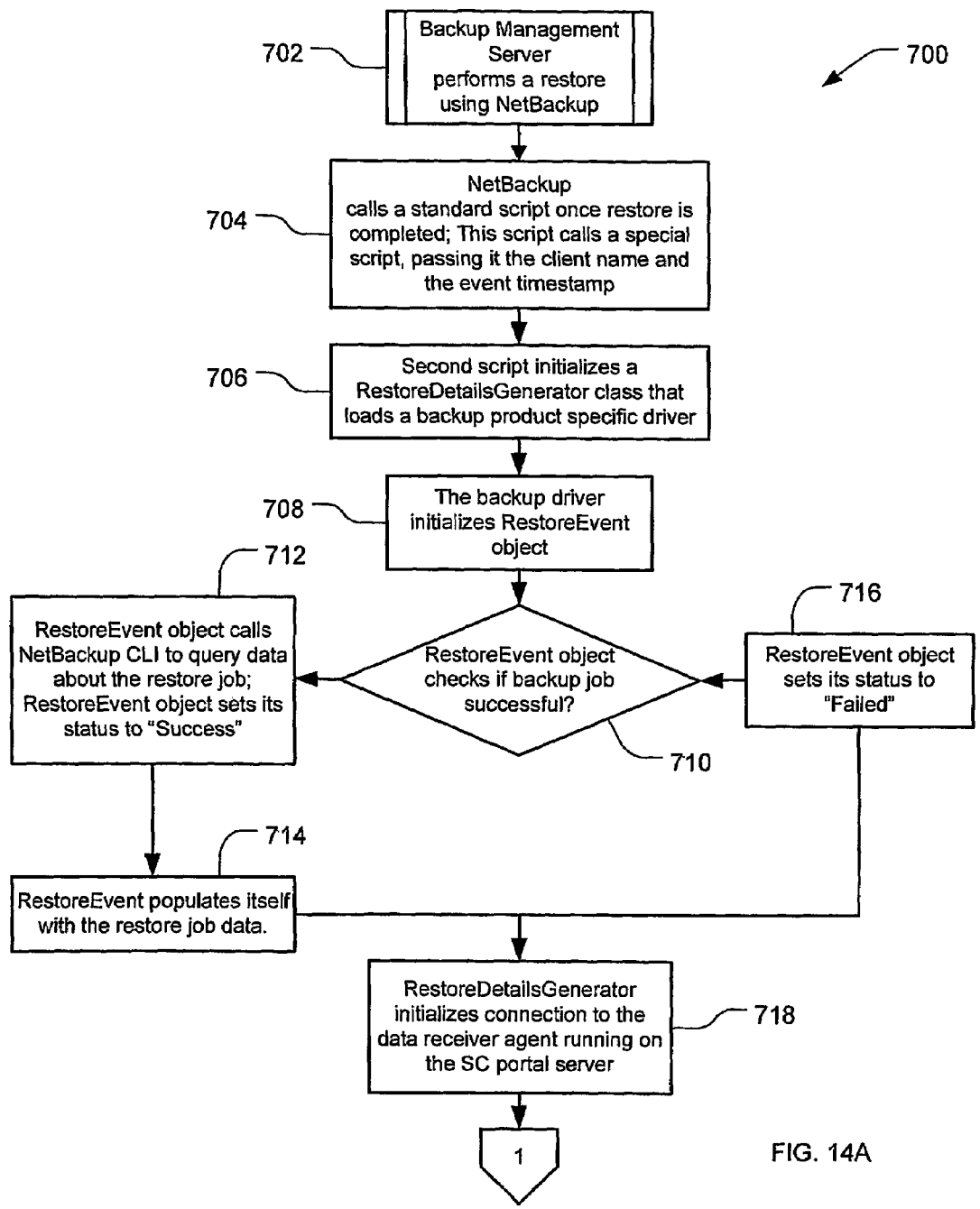
FIG. 14A-B are a flow chart depicting an example restore process, again using NetBackup as backup server software.
Figure 14B:
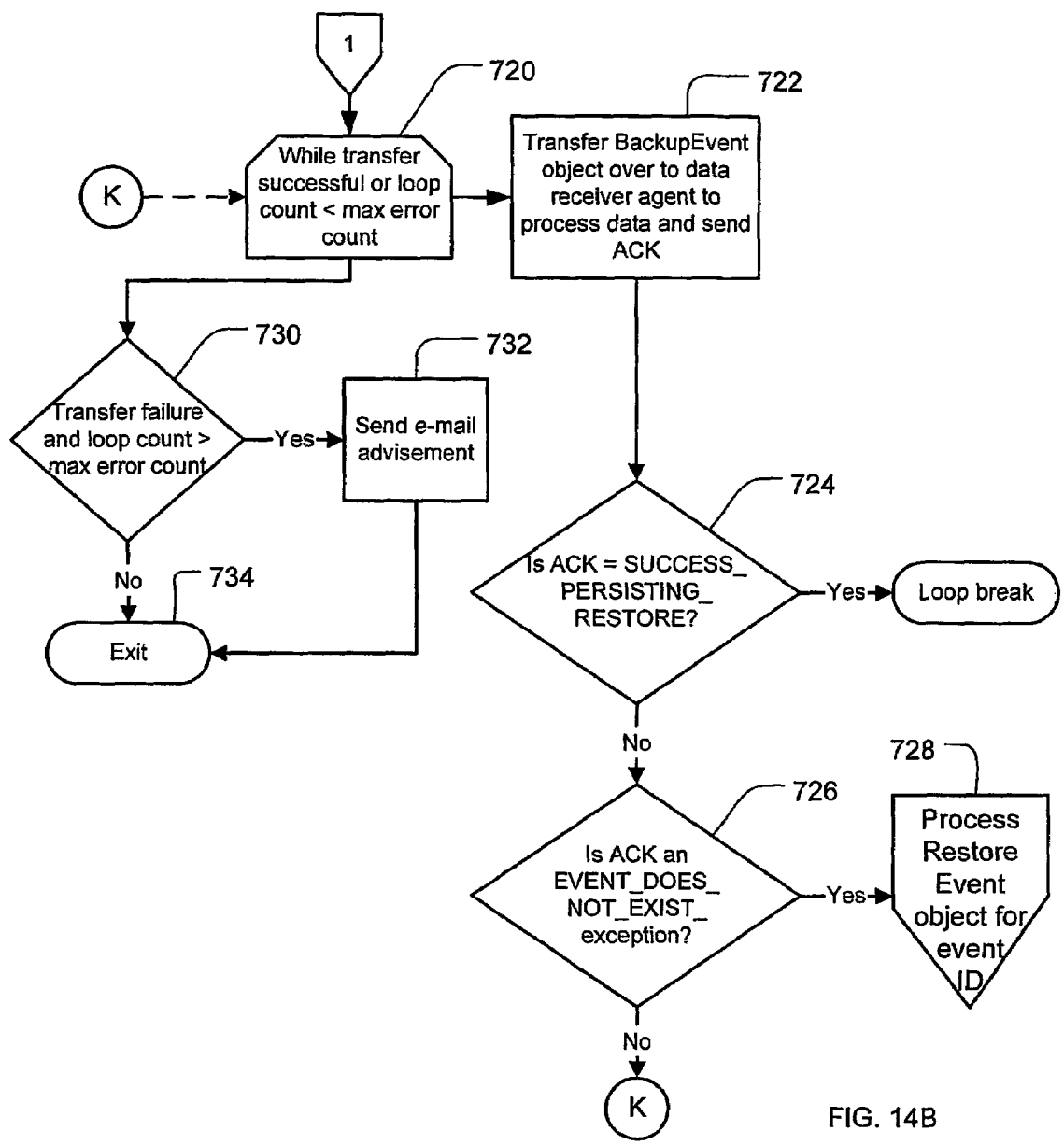

FIG. 14A-B are a flow chart depicting an example restore process 700, again using NetBackup as backup server software 42. In large part, process 700 resembles process 600 described above. In a step 702, a restore job is performed on a BMS 22. In a step 704, NetBackup completes this job and calls a standard script (e.g., $NETBACKUP_HOME/restore_notify) once the restore is completed. This starts a special script (e.g., $APTARE_HOME/mbs/bin/restoretrigger.sh), passing it the client name and the event time stamp (so the GBS 10 can identify the particular backup event). In a step 706, the special script then initializes a RestoreDetailsGenerator class that loads a backup driver specific to the type of backup server software 42 that performed the backup.

In a step 708, the backup driver initializes a RestoreEvent object and in a step 710 the RestoreEvent object makes a determination if the backup job was successful. If the job is determined to be successful, in a step 712 the RestoreEvent object calls the NetBackup command line interface (CLI) to query data about the restore job and sets its status to "Success". In a step 714 the RestoreEvent object populates itself with the restore job data. Alternately, if the job is determined to be unsuccessful, in a step 716 the RestoreEvent object sets its status to "Failed".

Then, in a step 718, the BackupDetailsGenerator initializes connection to the data receiver agent 520 running on the SC portal server 30 and in a step 720 data transfer commences in an iterative manner as long as the transfer is successful or a loop count is less than the pre-set max error count (a "while condition").

In a step 722, the RestoreEvent object is transferred to the data receiver agent 520 and the data receiver agent 520 processes the data and sends back an acknowledgement (ACK).

In a step 724, determination is made if the ACK indicates success in persisting the restore data into the SC database 54. If so, process 700 is finished. Otherwise, in a step 726 a determination is made if the ACK indicates an event does not exist exception. If so, a sub-process 728 processes the RestoreEvent object for the given event ID. And otherwise, step 720 is returned to for another iteration (K loop).

Picking up again in step 720, only now considering the case that the "while condition" is not met, in a step 730 a determination is made if transfer has not been successful and the loop count is equal or greater than the pre-set max error count (i.e., that here has been a serious failure). If so, in a step 732 an e-mail advisement is sent to an appropriate party, and in a step 734 the process 700 is exited.

With reference again to FIG. 11, the cron agent 508 is implemented a standalone Java demon process, which spawns threads for its child agents 510 based on the jobs declared in a Crontab file. Currently, the inventors have the cron agent 508 spawn multiple threads (e.g., 5 or more, one each for various jobs (child agents 510), namely the Restore Scheduler, Tape Inventory, Tape Details, Tape Status, and other. Each of these child agents 510 is configured to run at particular time intervals.

The restore scheduler child agent 510 is initiated to poll the job queue agent 522 to determine if a restore job is pending for its BMS 22. If so, the restore scheduler calls the backup server software 42, via its CLI, to initiate that restore job.

The tape inventory child agent 510 is initiated to call the backup server software 42 to gather a list of the robots and tape drives present on its BMS 22. The tape details child agent ## is initiated to call the backup server software 42 to gather a list of the tapes in a tape library on its BMS 22. The tape status child agent 510 is initiated to call the backup server software 42 to gather the status of the tapes within the tape library. The policy details child agent 510 captures all of the backup policies that are maintained by the backup server software 42. The backup polices define rules that the backup server software follows when backing up the client servers 20. The storage unit details child agent 510 captures all of the storage unit details from the backup server software 42. In backup server software 42, such as NetBackup, a storage unit is a group of one or more storage devices 46 of a specific type and storage density in a BMS 22. The information from these child agents 510 is collected, packaged into Java Objects, serialized, magic keyed, compressed and transported to the data receiver agent 520.

The smart updater child agent 510 pools the data receiver agent 520 in the SCS 14 for updates to the core libraries in the SC database 54. In the case it finds newer version of the core library, the smart updater automatically downloads it and re-starts the cron agent 508 and the event agent 504.

As mentioned previously, the data receiver agent 520 is implemented as a Java servlet that is configured to listen for requests from the event triggers 504, 506 and the child agents 510 of the cron agent 508 on the BMSs 22. On receiving a request, the data receiver agent 520 decodes the information and determines what type of request it has just received. Once the type of the message has been deciphered, the data is authenticated, decompressed, de-serialized and persisted into the SC database 54.

Figure 15A:
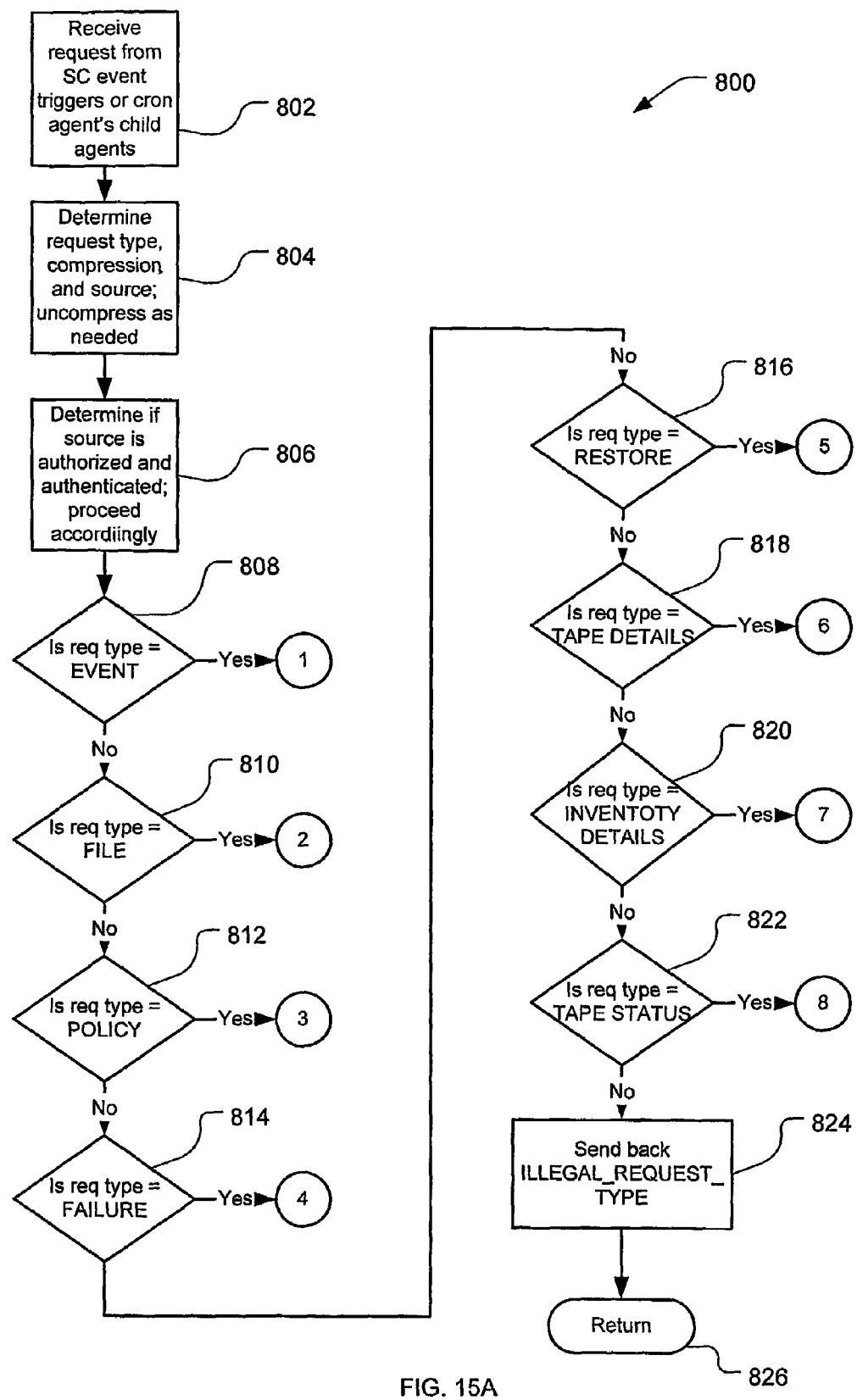
FIG. 15A-C are a flow chart depicting a suitable flow process for the data receiver agent of the invention.
Figure 15B:
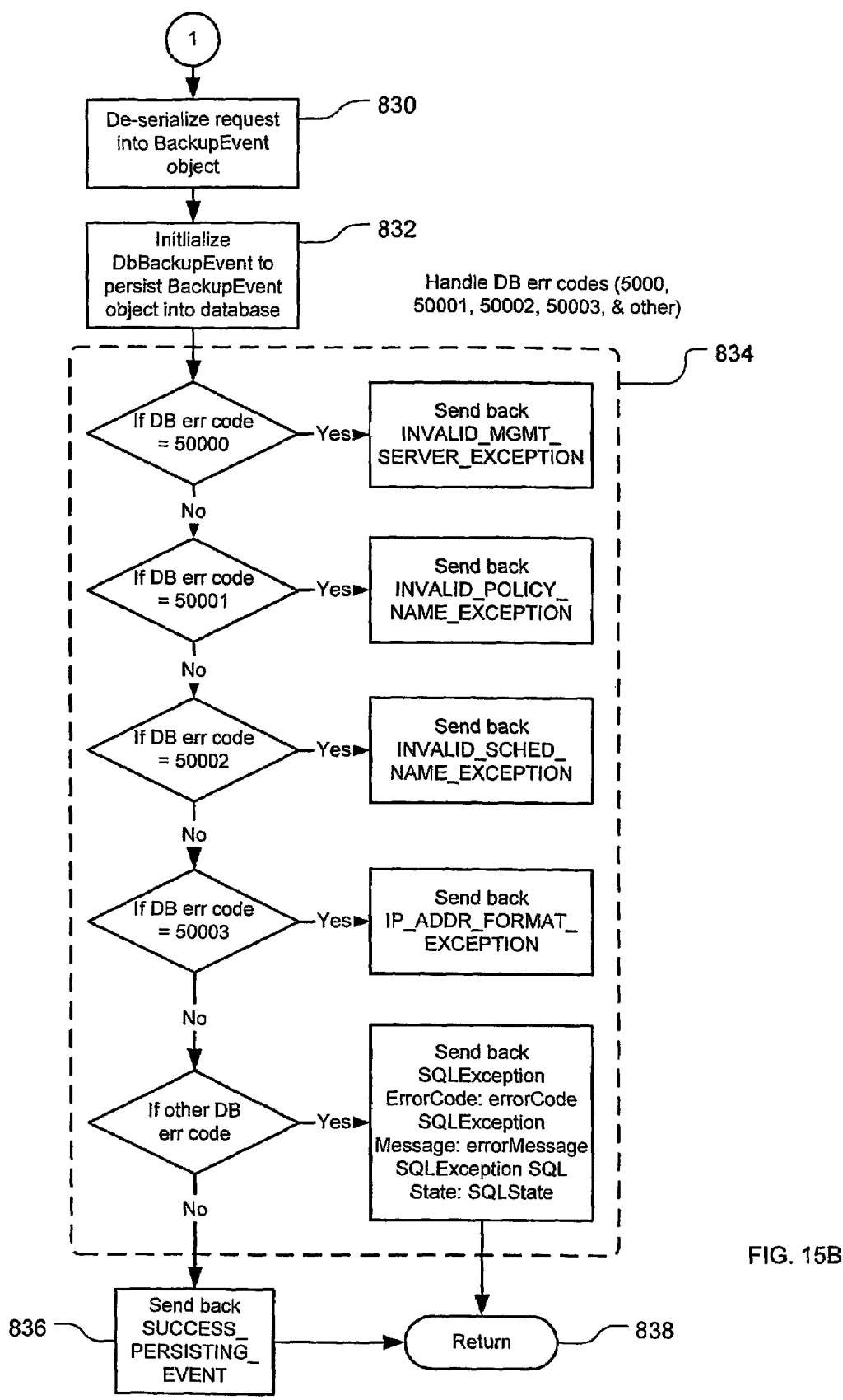
Figure 15C:
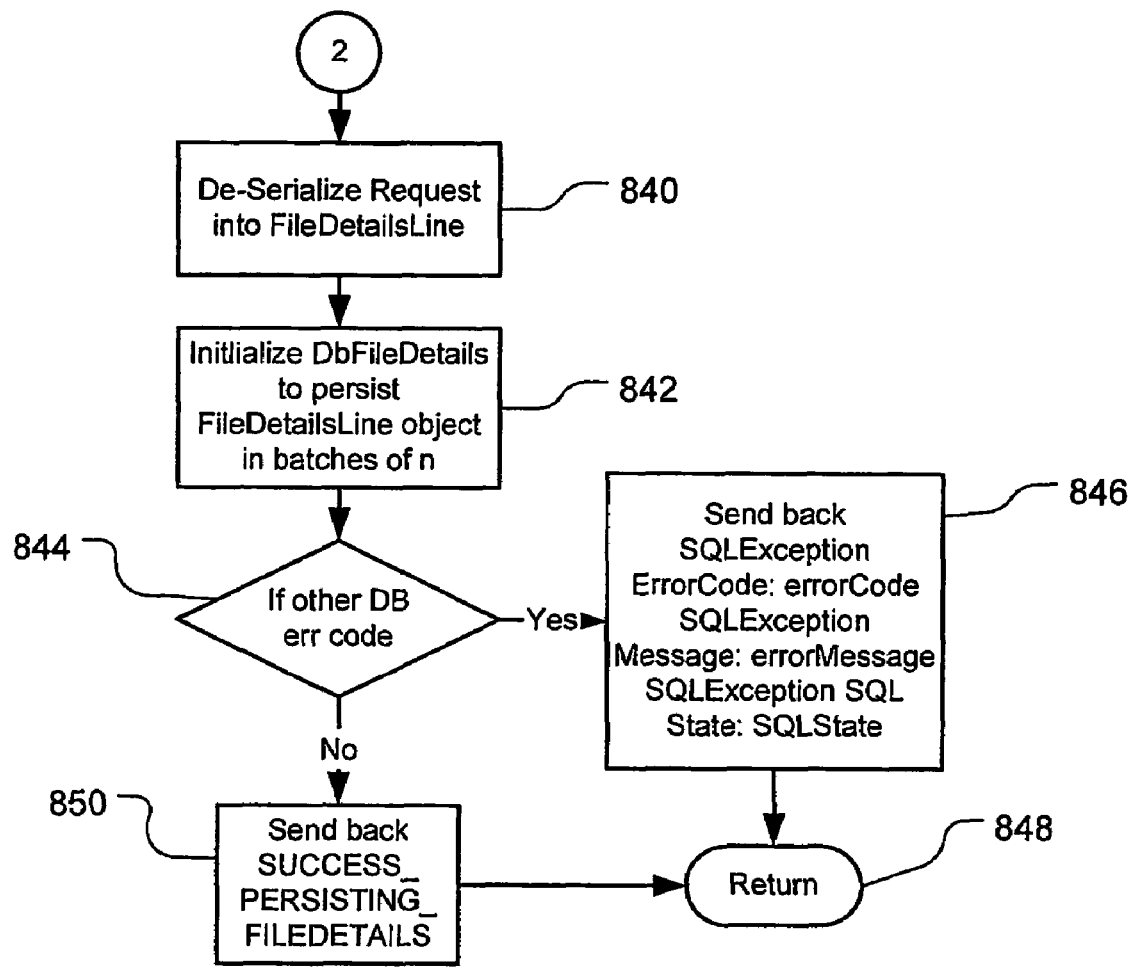

FIG. 15A-C are a flow chart depicting a suitable flow process 800 for the data receiver agent 520. In a step 802, the data receiver agent 520 receives a request from the event triggers (the event agent 504 or the restore event trigger 506) or a child agent 510 of the cron agent 508. In a step 804, the request type, compression and source are determined, and un-compression is performed as needed. In a step 806, whether the source of the request is authorized and authenticated is determined, and appropriate action is taken. In a steps 808-822, determinations are made about the request type and appropriate branches are followed for further process. If none of the types are proper, however, in a step 824 a message that an illegal request has been made can be sent back, and in a step 826 the process 800 returns control to the SC portal server 30 for other tasks.

If the request type was "EVENT", in a step 830 the BackupEvent object in the request is de-serialized. Then, in a step 832 a DbBackupEvent object is initialized to persist the BackupEvent object into the SC database 54. Next, in a sub-process 834, any error codes are processed. If there were no error codes, in a step 836 the data receiver agent 520 sends a message that persisting the BackupEvent object was successful, and in a step 838 the process 800 returns control to the SC portal server 30 for other tasks.

If the request type was "POLICY", "FAILURE", "RESTORE", "TAPE DETAILS", "INVENTORY DETAILS", or "TAPE STATUS" (branches "3" through "8" in FIG. 15A) the steps are effectively the same. The object is de-serialized; a Db-type object is initialized to persist the received object into the SC database 54; the sub-process 834 looks for and processes any error codes (these can vary as needed, say, if processing "TAPE DETAILS" could result in particular error codes); if there were no error codes, the data receiver agent 520 sends an appropriate message that persisting the object was successful; and the process 800 returns control to the SC portal server 30 for other tasks.

If the request type was "FILE", however, a slightly different approach is used. In a step 840 the FileDetailsLine object in the request is de-serialized. Then, in a step 842 a DbFileDetails object is initialized to persist the FileDetailsLine object into the SC database 54. Next, in steps 844-846, any error codes are processed, and in a step 848 the process 800 returns control to the SC portal server 30. If there were no error codes, in a step 850 the data receiver agent 520 sends a message that persisting the FileDetailsLine object was successful, and in step 848 the process 800 returns control to the SC portal server 30.

With reference again to FIG. 11, every child agent 510 of the cron agent 508 may be implemented with an automatic recovery feature, to execute in the event of an exception condition occurring during the transmission of meta data from its BMS 22 to the data receiver agent 520. The child agent 510 tries to transmit the meta-data to the data receiver agent 520 a configurable number of times, or until the child agent 510 receives an acknowledgement from the data receiver agent 520. The interval between the retries is also a configurable parameter. The default data transmission mechanism is Java object serialized over HTTP(s). The re-try logic uses this data transmission mechanism to transfer the data, but in the event of a communication failure, the child agent 510 tries to use an alternate transmission mechanism. The alternate mechanism used may be transmitting data over SMTP (Simple Mail Transfer Protocol). An email message containing the textual representation of the meta data can be sent over SMTP to the data receiver agent 520. This alternate transmission mechanism is used to transmit the data a configurable number of times, or until the child agent 510 receives an acknowledgement. If the child agent 510 is still unsuccessful in transmitting the data, an email message containing a suitable error message, e.g., the possible cause and source of the message, is sent to an appropriate party.

As was discussed previously, the backup event agent 504 transmits backup event related meta data to the data receiver agent 520, where the backup event is related to the client server 20 that was backed up by the backup management server. The data receiver agent 520 validates the information about the client server 20 that is part of the backup meta-data. In the case the client server 20 does not exist in the SC database 54, however, information for the client server 20 can be automatically added into the SC database 54. These is straightforward, since the client server 20 is also associated to the default server group that its BMS 22 belongs to. The same can happen when a new client server 20 is encountered as the data receiver agent 520 processes restore event meta-data.

The foregoing drawing figures and descriptions are not intended to be exhaustive or to limit the invention to the forms and embodiments disclosed. Rather, specific details are presented to illustrate the invention. In light of the teachings herein, the techniques known to those skilled in the art, and advances in the art yet to be made, numerous modifications, variations, selections among alternatives, changes in form, and improvements can be made to the invention. Thus, the breadth and scope of the invention should not be interpreted in a limited manner, and should be defined only in accordance with the following claims and their equivalents.

INDUSTRIAL APPLICABILITY

The present invention is well suited for application to manage and store backup and recovery meta data.

As has been described herein in the context of the global backup system (GBS 10), various embodiments of the invention, provide methods and apparatuses for one or more of the following: for providing a centralized repository for meta data and related communication and control mechanisms; for efficiently storing and retrieving the meta data at the Storage-Console server (SCS 14); for securely and efficiently transferring meta data and other backup information over a network (I-net 16); for reducing the footprint on the backup management servers (BNSs 22) of a StorageConsole agent (SC agent 48) that directs the process of gathering the meta data and sending it to the SCS 14; for automatically recovering from exceptions, or for automatically provisioning a client server 20 that is newly added to the enterprise; and for meaningfully representing and presenting the status of the GBS 10.

On request, some embodiments of the invention display an array of aggregated status indicators. The aggregated status indicators are displayed in what is termed herein a mission control report (MCR 80).

Rows of the array of aggregated status indicators correspond with servers within the enterprise or correspond with domains where each domain contains multiple servers. Columns of the array correspond with time intervals, including but not limited to a particular day or week. Aggregated status indicators within cells of the array display the aggregated status of every backup or restore event that occurred for the server(s) or domain(s) that correspond to the cell during the time interval that corresponds to the cell.

Aggregated status indicators may have various iconic shapes and colors; for example, a green smiley face may indicate that all scheduled backup and restore events were completely successful, a yellow neutral face may indicate that at least one backup or restore event generated a warning, and a red frowning face may indicate that at least one of the events failed. By looking at the array of aggregated status indicators, the system administrator can see at a glance a meaningful representation of the current status of the backup system for which he is responsible.

Some embodiments of the invention meet the need for efficient storage and retrieval of meta data by appropriately structuring the meta data in a relational database or in a similar data structure (the SC database 54). This employs a schema 70 that includes a file table 72, a backup table 74, and a link table 76.

The file table 72 contains one entry or row for each separate file, folder or link (also known as a shortcut) on a server that is backed up. The backup table 74 contains one row for each backup event. The link table 76 contains one row for every occasion on which any file was backed up, where each row in the link table 76 contains a pointer to the file-table row for that the file that was backed up and also contains a pointer to the backup-table row for the backup event in which the file was backed up.

The link table 76 may grow to be very large. For example, if an enterprise has 50,000 files that are fully backed up once a day and the backup copies of the files are kept for 180 days, then the link table 76 will contain 9 million entries. Such a large number of potential entries makes it particularly advantageous that each row in the link table 76 is small. Each link-table row is small because it points to, but does not duplicate, the meta data about the file involved and the meta data about the backup event involved.

Further, finding all backup events that include a particular file can be efficiently performed. Such a find operation consists of selecting those entries in a link table 76 that contain a pointer to the corresponding file-table row.

Some embodiments of the invention meet the need for efficient and secure transfer of meta data and other backup information by using the secure hyper-text transfer protocol (S-HTTP or HTTPS), by using public keys in the HTTPS communication that come from digital server certificates that are signed and verified by a trusted third party, by initiating communication only from the BMSs 22 to the SC portal server 30 and never the other way around, or by including in each message that initiates a communication session an identity verification tag or magic key that is unique to the BMS 22 initiating the session.

Because a BMS 22 never responds to a communication session that an external device is attempting to initiate, there is no way that a curious person, a deliberate hacker or any kind of impostor can use this communication path to compromise the security of any BMS 22.

The magic key used some embodiments of in the GBS 10 is an encoded form of information tokens. At least some of the information tokens have unique values for each BMS 22, making it unlikely that a communication session can be accidentally or maliciously initiated from any device other than the BMS 22 that purports to initiate the session.

Some embodiments of the invention meet the need for reducing the footprint on the BMSs 22 of the process of gathering the meta data and sending it to the SC portal server 30 by running only light-weight software on the BMSs 22 as the SC agents 48.

The footprint of the SC agents 48 is reduced by using one or more of the following techniques: by executing only when a backup or restore event terminates, and not when a polling or request message is received from the server; by communicating with the SC portal server 30 only via HTTP or HTTPS sessions initiated by the SC agent 48, and not allowing the SC portal server 30 to initiate communications; and by storing data only at the SCS 14 and not storing any data on any BMS 22.

Some embodiments of the invention meet the need for automatically recovering from exceptions by expecting an acknowledgement message in response to every communication that occurs over the I-net 16 (Internet and/or intranet), and then retrying the communication until such an acknowledgement is received.

The interval between retries, or the schedule of time intervals to be used between the retries, can be configured. A maximum number of retries can be set. If this number is exceeded without a successful acknowledgement, then the GBS 10 initiates communication via a secondary channel. In some embodiments, this escalation process can be repeated as needed, that is, if the secondary-channel communication is not acknowledged then it is tried again and if necessary third-level fallback channels, and so on, are used.

Such fallback communication channels may include, but are not limited to: accessing servers via alternate communication links; accessing alternate servers; or sending e-mail messages describing the failure to one or more designated e-mail address. The use of these escalating or fallback communication channels allows the GBS 10 to recover from many exceptions without loosing the integrity of the meta data, without loosing the ability to communicate, and with a minimal amount of intervention from system administrators.

Some embodiments of the invention also meet the need for automatically provisioning a client server 20 that is newly added to an enterprise. If in the course of a processing a backup or restore event, it is determined that a client server 20 has no entry in the SC database 54, an acknowledgement message can be sent back to the SC agent 48 that both confirms correct receipt of the meta data for the event and that further requests that the SC agent 48 gather the basic information necessary to enter the new client server 20 into the SC database 54.

These embodiments can further be implemented to automatically add basic information to the SC database 54 and to assign new client servers 20 to the default group of BMSs 22 that were established when an enterprise was initially set up to use the SCS 14. Initial values used for a new client server 20 for configuration settings that can be altered on a system by system basis can be taken from established client servers 20 for a default BMS 22 within the enterprise network 12.

For the above, and other, reasons, it is expected that the global backup system (GBS 10) of the present invention will have widespread industrial applicability. Therefore, it is expected that the commercial utility of the present invention will be extensive and long lasting.

What is claimed is:

1. A computer-implemented system to manage backup and recovery meta data, comprising:
   a computerized console portal system comprising at least one computing device configured to receive the backup and recovery meta data over a network from at least one agent and at least one computerized backup management system, and to maintain a database including the backup and recovery meta data; and
   wherein the computerized console portal system being configured to maintain the database includes the computerized console portal system being configured to cause the received backup and recovery meta data to be stored into the database according to a database schema having a file table, a backup table, and a link table, the file table, the backup table and the link table all configured to store at least a portion of the received backup and recovery meta data, wherein said file table has entries for each file the meta data relates to, said backup table has entries for each backup event the meta data relates to, and said link table links said file table and said backup table,
   wherein said link table includes a plurality of entries, each entry uniquely corresponding to a particular file backed up during a particular backup event, wherein each entry of said link table includes
      a link to an entry in said file table for the particular file to which that entry of the link table corresponds, and
      a link to the entry in said backup table for the backup event during which the particular file was backed up;
   wherein the computerized console portal system being configured to maintain said database to further include the computerized console portal system being configured to maintain, in the database, at least one of backup statistics, restore statistics, policy data, and instructions to one or more of said at least one agent, and
   wherein the computerized console portal system includes a database server hardware computing device and a portal server hardware computing device.

2. The computer-implemented system of claim 1, wherein said computerized console portal system includes:
   the portal server hardware computing device being on a machine separate from said database server hardware computing device.

3. The computer-implemented system of claim 1, wherein said computerized console portal system being configured to maintain the database includes the computerized console portal system being configured to maintain the file table to contain a plurality of rows, one row for each backed up file, said rows each including at least one field that is a member of the set consisting of:
   a file identifier for said file represented by this said row;
   a file type for this said file;
   a file owner for this said file;
   a server identifier for a client server on which this said file is stored; and
   a file identifier for a said file table row representing a parent directory that contains this said file.

4. The computer-implemented system of claim 1, wherein said computerized console portal system being configured to maintain the database includes the computerized console portal system being configured to maintain the backup table to contain a plurality of rows, one row for each stored backup event, said rows each including at least one field that is a member of the set consisting of:
   a backup identifier for said backup event represented by this said row;
   a date and time at which this said backup event started;
   a date and time at which this said backup event ended;
   a count of said files backed up in this said backup event;
   a quantity of bytes backed up in this said backup event;
   a status for this said backup event; and
   a server identifier for a client server on which said files for this said backup event are stored.

5. The computer-implemented system of claim 1, wherein said computerized console portal system being configured to maintain the database includes the computerized console portal system being configured to maintain the link table to contain one row for each time that a particular said file has been backed up, said rows including at least one field that is a member of the set consisting of:
   a file identifier of said file that was backed up;
   a backup identifier of said backup event during which this said file was backed up;
   a size of this said file backed up in this said backup event; and
   a data and time that this said file backed up in this said backup event was last modified.

6. The computer-implemented system of claim 1, wherein said computerized console portal system and said at least one agent communicate over said network using HTTP or HTTPS protocol.

7. The computer-implemented system of claim 1, wherein:
   said computerized console portal system is configured to receive the meta data from said at least one agent in streamed, raw form; and
   said computerized console portal system is configured to process the meta data to render the meta data suitable for storage in said schema in said database.

8. A computer-implemented method to manage backup and recovery meta data, comprising:
   by a computerized console portal system, receiving the backup and recovery meta data over a network from at least one agent and at least one computerized backup management system; and
   by the computerized console portal system, maintaining the received backup and recovery data in a database including causing the received backup and recovery meta data to be held in the database according to a database schema having a file table, a backup table, and a link table, the file table, the backup table and the link table all configured to store at least a portion of the received backup and recovery meta data, wherein said file table has entries for each file the meta data relates to, said backup table has entries for each backup event the meta data relates to, and said link table links said file table and said backup table,
   wherein said link table includes a plurality of entries, each entry uniquely corresponding to a particular file backed up during a particular backup event, wherein each entry of said link table includes a link to an entry in said file table for the particular file to which that entry of the link table corresponds, and a link to the entry in said backup table for the backup event during which the particular file was backed up;

wherein the computerized console portal system being configured to maintain said database to further include the computerized console portal system being configured to maintain, in the database, at least one of backup statistics, restore statistics, policy data, and instructions to one or more of said at least one agent and wherein the computerized console portal system includes a database server hardware computing device and a portal server hardware computing device.

9. The computer-implemented method of claim 8, wherein said computerized console portal system includes:

the portal server hardware computing device being on a machine separate from said database server hardware computing device.

10. The computer-implemented method of claim 8, wherein the computerized console portal system maintaining the database includes the computerized console portal system maintaining said file table to contain one row for each backed up file, said rows including at least one field that is a member of the set consisting of:

a file identifier for said file represented by this said row;

a file type for this said file;

a file owner for this said file;

a server identifier for a client server on which this said file is stored; and a file identifier for a said file table row representing a parent directory that contains this said file.

11. The computer-implemented method of claim 9, wherein said computerized console portal system maintain the database includes the computerized console portal system maintaining the backup table to contain one row for each stored backup event, said rows including at least one field that is a member of the set consisting of:

a backup identifier for said backup event represented by this said row;

a date and time at which this said backup event started;

a date and time at which this said backup event ended;

a count of said files backed up in this said backup event;

a quantity of bytes backed up in this said backup event;

a status for this said backup event; and a server identifier for a client server on which said files for this said backup event are stored.

12. The computer-implemented method of claim 8, wherein said computerized console portal system being configured to maintain the database includes the computerized console portal system being configured to maintain the link table to contain one row for each time that a particular said file has been backed up, said rows including at least one field that is a member of the set consisting of:

a file identifier of said file that was backed up;

a backup identifier of said backup event during which this said file was backed up;

a size of this said file backed up in this said backup event; and a data and time that this said file backed up in this said backup event was last modified.

13. The computer-implemented method of claim 8, wherein said console computerized console portal system and said at least one agent communicate over said network using HTTP or HTTPS protocol.

14. The computer-implemented method of claim 8, wherein:

said computerized console portal system receives the meta data from said at least one agent in streamed, raw form; and said computerized console portal system processes the meta data to render it suitable for storage in said schema in said database.

15. A computing system to manage backup and recovery meta data, comprising:

a computerized system comprising at least one computing device configured to receive the backup and recovery meta data over a network from at least one agent and at least one computerized backup management system, and to maintain a database including the backup and recovery meta data; and wherein the computerized system being configured to maintain the database includes the computerized system being configured to cause the received backup and recovery meta data to be stored into the database according to a database schema having a file table, a backup table, and a link table, the file table, the backup table and the link table all configured to store at least a portion of the received backup and recovery meta data, wherein said file table has entries for each file the meta data relates to, said backup table has entries for each backup event the meta data relates to, and said link table links said file table and said backup table, wherein said link table includes a plurality of entries, each entry uniquely corresponding to a particular file backed up during a particular backup event, wherein each entry of said link table includes a link to an entry in said file table for the particular file to which that entry of the link table corresponds, and a link to the entry in said backup table for the backup event during which the particular file was backed up;

wherein the computerized system being configured to maintain said database to further include the computerized system being configured to maintain, in the database, at least one of backup statistics, restore statistics, policy data, and instructions to one or more of said at least one agent, and wherein the computerized console portal system includes a database server hardware computing device and a portal server hardware computing device.

* * * * *